US012694056B2

(12) United States Patent
Li et al.

(10) Patent No.: US 12,694,056 B2
(45) Date of Patent: Jul. 28, 2026

(54) MODEL TRAINING METHOD AND APPARATUS, COMPUTER DEVICE, AND STORAGE MEDIUM

(71) Applicant: Tencent Technology (Shenzhen) Company Limited, Shenzhen (CN)

(72) Inventors: Gongfu Li, Shenzhen (CN); Jinpeng Wang, Shenzhen (CN); Yiru Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/603,068

(22) Filed: Mar. 12, 2024

(65) Prior Publication Data

US 2024/0256601 A1 Aug. 1, 2024

Related U.S. Application Data

(63) Continuation of application No. PCT/CN2023/108065, filed on Jul. 19, 2023.

(30) Foreign Application Priority Data

Sep. 1, 2022 (CN) .......................... 202211064544.5

(51) Int. Cl.
G06F 7/00 (2006.01)
G06F 16/732 (2019.01)
(52) U.S. Cl.
CPC ................................ G06F 16/7335 (2019.01)
(58) Field of Classification Search
CPC .... G06F 16/7335; G06F 16/33; G06F 16/903; G06F 16/9032; G06F 16/90335; G06F 18/214; G06F 18/23; G06F 18/22
See application file for complete search history.

(56) References Cited

U.S. PATENT DOCUMENTS

| 11,341,366 B2 * | 5/2022 | Niu | ...................... | G06V 10/764 |
| 11,706,492 B1 * | 7/2023 | Yoo | ...................... | G06V 10/235 |
| | | | | 725/86 |

(Continued)

FOREIGN PATENT DOCUMENTS

| CN | 113590850 A | 11/2021 |
| CN | 113779361 A | 12/2021 |

(Continued)

OTHER PUBLICATIONS

Multi-grained encoding and joint embedding space fusion for video and text cross-modal retrieval, Xiaotao Cui, Jing Xiao, Yang Cao, Jia Zhu, School of Computer Science, South China Normal University, Guangzhou, China, May 2022 (Year: 2022).*

(Continued)

*Primary Examiner* — Mohammed R Uddin
(74) *Attorney, Agent, or Firm* — Morgan, Lewis & Bockius LLP

(57) ABSTRACT

Embodiments of this application disclose a video content retrieval method performed by a computer device. The method includes: obtaining a query text; performing feature extraction processing on the query text through a video content retrieval model, to obtain a plurality of text content features at different feature granularities; calculating, based on the text content feature of each feature granularity, a similarity corresponding to the query and a candidate video content retrieval result at the corresponding feature granularity; and determining, based on the similarities at different feature granularities, a video content retrieval result corresponding to the query text. The solution may improve model training for the content retrieval model and improve content retrieval precision of the content retrieval model.

20 Claims, 9 Drawing Sheets

(56) References Cited

U.S. PATENT DOCUMENTS

| 2011/0184950 | A1* | 7/2011 | Skaff | G06F 16/54 |
| | | | | 715/810 |
| 2020/0242304 | A1* | 7/2020 | Li | G06F 40/30 |
| 2021/0109966 | A1* | 4/2021 | Ayush | G06N 3/044 |
| 2021/0209155 | A1* | 7/2021 | Yang | G06F 16/7837 |
| 2021/0240761 | A1* | 8/2021 | Wang | G06F 40/216 |
| 2021/0406601 | A1* | 12/2021 | Narlikar | G06F 18/213 |
| 2022/0086401 | A1* | 3/2022 | Hu | H04N 21/2187 |
| 2022/0284246 | A1* | 9/2022 | He | G06F 18/2178 |
| 2022/0292131 | A1* | 9/2022 | Bai | G06V 10/74 |
| 2022/0309280 | A1* | 9/2022 | Singhal | G06Q 30/0623 |
| 2023/0154188 | A1* | 5/2023 | Li | G06V 10/776 |
| | | | | 382/159 |

FOREIGN PATENT DOCUMENTS

| CN | 113806482 | A | 12/2021 |
| CN | 113821687 | A | 12/2021 |
| CN | 113946698 | A | 1/2022 |
| CN | 114780766 | A | 7/2022 |
| CN | 114817655 | A | 7/2022 |
| WO | WO 2022068196 | A1 | 4/2022 |

OTHER PUBLICATIONS

Xiaotao Cui, Jing Xiao, Yang Cao, Jia Zhu, School of Computer Science, South China Normal University, Guangzhou, China (Year: 2022).*

Coarse-to-Fine Semantic Alignment for Cross-Modal Moment Localization; Yupeng Hu, Liqiang Nie, Meng Liu, Kun Wang, Yinglong Wang, and Xian-Sheng Hua, IEEE, 2021 (Year: 2021).*

Tencent Technology, ISR, PCT/CN2023/108065, Oct. 23, 2023, 3 pgs.

Jinpeng Wang et al., "Hybrid Contrastive Quantization for Efficient Cross-View Video Retrieval", WWW '22: Proceedings of the ACM Web Conference 2022, Apr. 2022, 11 pgs.

* cited by examiner

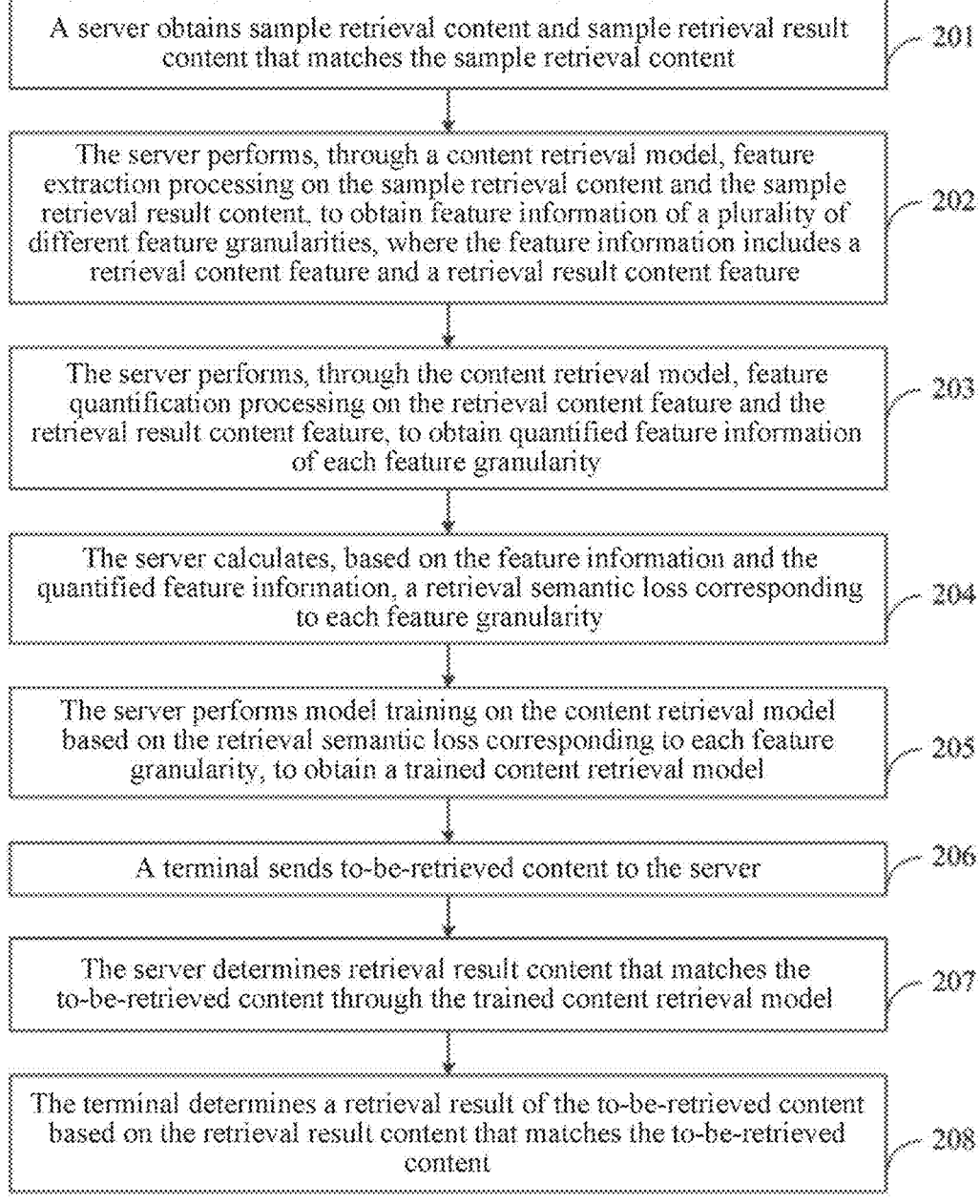

A server obtains sample retrieval content and sample retrieval result content that matches the sample retrieval content ⟋ 201

The server performs, through a content retrieval model, feature extraction processing on the sample retrieval content and the sample retrieval result content, to obtain feature information of a plurality of different feature granularities, where the feature information includes a retrieval content feature and a retrieval result content feature ⟋ 202

The server performs, through the content retrieval model, feature quantification processing on the retrieval content feature and the retrieval result content feature, to obtain quantified feature information of each feature granularity ⟋ 203

The server calculates, based on the feature information and the quantified feature information, a retrieval semantic loss corresponding to each feature granularity ⟋ 204

The server performs model training on the content retrieval model based on the retrieval semantic loss corresponding to each feature granularity, to obtain a trained content retrieval model ⟋ 205

A terminal sends to-be-retrieved content to the server ⟋ 206

The server determines retrieval result content that matches the to-be-retrieved content through the trained content retrieval model ⟋ 207

The terminal determines a retrieval result of the to-be-retrieved content based on the retrieval result content that matches the to-be-retrieved content ⟋ 208

FIG. 4

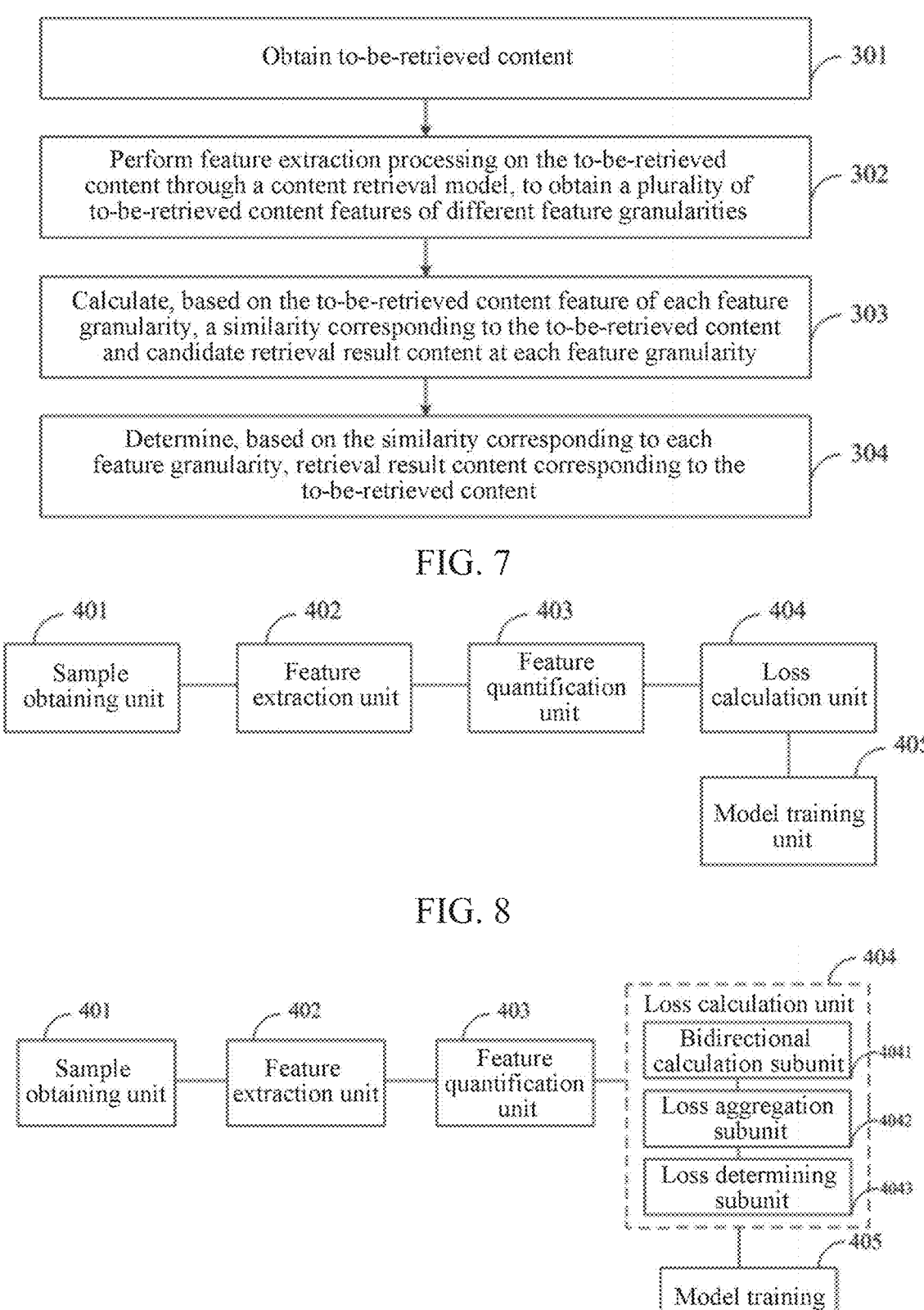

Obtain to-be-retrieved content — 301

Perform feature extraction processing on the to-be-retrieved content through a content retrieval model, to obtain a plurality of to-be-retrieved content features of different feature granularities — 302

Calculate, based on the to-be-retrieved content feature of each feature granularity, a similarity corresponding to the to-be-retrieved content and candidate retrieval result content at each feature granularity — 303

Determine, based on the similarity corresponding to each feature granularity, retrieval result content corresponding to the to-be-retrieved content — 304

FIG. 7

401 Sample obtaining unit

402 Feature extraction unit

403 Feature quantification unit

404 Loss calculation unit

405 Model training unit

FIG. 8

401 Sample obtaining unit

402 Feature extraction unit

403 Feature quantification unit

404 Loss calculation unit
4041 Bidirectional calculation subunit
4042 Loss aggregation subunit
4043 Loss determining subunit 405 Model training unit

FIG. 9

MODEL TRAINING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2023/108065, entitled "MODEL TRAINING METHOD AND APPARATUS, COMPUTER DEVICE, AND STORAGE MEDIUM" filed on Jul. 19, 2023, which claims priority to Chinese Patent Application No. 2022110645445, entitled "MODEL TRAINING METHOD AND APPARATUS, COMPUTER DEVICE, AND STORAGE MEDIUM" filed with the China Intellectual Property Administration on Sep. 1, 2022, all of which is incorporated herein by reference in its entirety.

FIELD OF THE TECHNOLOGY

This application relates to the field of artificial intelligence technologies, and specifically, to machine learning technologies.

BACKGROUND OF THE DISCLOSURE

In a content retrieval scenario, a content retrieval model may be trained through sample data, so that a trained model may meet an expected content retrieval requirement. For example, the trained model may determine retrieval result content that matches retrieval content.

However, the current content retrieval model for retrieval based on content features still needs to be improved. For example, as a training process proceeds, there is a large semantic deviation between a retrieval content feature and a retrieval result content feature, resulting in a decrease in retrieval precision; and for another example, when there is a large difference between the retrieval content feature and the retrieval result content feature, retrieval accuracy also accordingly decreases.

SUMMARY

Embodiments of this application provide a model training method and apparatus, a computer device, and a storage medium, to improve model training for a content retrieval model and improve content retrieval precision of the content retrieval model.

Embodiments of this application provide a model training method, performed by a computer device, the method including:

obtaining sample retrieval content and sample retrieval result content that matches the sample retrieval content;

performing, through a content retrieval model, feature extraction processing on the sample retrieval content and the sample retrieval result content, to obtain feature information of a plurality of different feature granularities, the feature information comprising a retrieval content feature and a retrieval result content feature;

performing, through the content retrieval model, feature quantification processing on the retrieval content feature and the retrieval result content feature, to obtain quantified feature information of each feature granularity;

calculating, based on the feature information and the quantified feature information, a retrieval semantic loss corresponding to each feature granularity; and performing model training on the content retrieval model based on the retrieval semantic loss corresponding to each feature granularity.

Correspondingly, embodiments of this application further provide a content retrieval method, performed by a computer device, the method including:

obtaining to-be-retrieved content;

performing feature extraction processing on the to-be-retrieved content through a content retrieval model, to obtain a plurality of to-be-retrieved content features of different feature granularities;

calculating, based on the to-be-retrieved content feature of each feature granularity, a similarity corresponding to the to-be-retrieved content and candidate retrieval result content at each feature granularity; and determining, based on the similarity corresponding to each feature granularity, retrieval result content corresponding to the to-be-retrieved content.

Correspondingly, embodiments of this application further provide a non-transitory computer-readable storage medium, storing a computer program, the computer program, when executed by a processor of a computer device, causing the computer device to implement the operations in the model training method or the content retrieval method shown in embodiments of this application.

Correspondingly, embodiments of this application further provide a computer device, including a memory, a processor, and a computer program stored on the memory and executable on the processor, the processor, when executing the computer program, implementing the operations in the model training method or the content retrieval method shown in embodiments of this application.

In embodiments of this application, sample retrieval content and sample retrieval result content that matches the sample retrieval content may be obtained; through a content retrieval model, feature extraction processing is performed on the sample retrieval content and the sample retrieval result content, to obtain feature information of a plurality of different feature granularities, the feature information including a retrieval content feature and a retrieval result content feature; through the content retrieval model, feature quantification processing is performed on the retrieval content feature and the retrieval result content feature, to obtain quantified feature information of each feature granularity; based on the feature information and the quantified feature information, a retrieval semantic loss corresponding to each feature granularity is calculated; and model training is performed on the content retrieval model based on the retrieval semantic loss corresponding to each feature granularity.

The solution may combine feature learning of content and quantification learning of features, so that the feature quantification module is added to training of feature learning. In this way, a semantic loss of feature quantification may be added to an objective of model training optimization, so that semantic information of the sample retrieval content and the sample retrieval result content may be better retained in the quantified feature, to avoid a large semantic deviation between the quantified content feature of the sample retrieval content and the quantified content feature of the sample retrieval result content due to a quantification loss caused by feature quantization when feature learning and feature quantification are independently executed. In addition, in the solution, when there is a large difference between the retrieval content feature and the retrieval result content feature (for example, when the retrieval content feature and the retrieval result content feature correspond to different feature modes), by extracting feature information of a plurality of different feature granularities, feature alignment may be further subsequently performed according to a plurality of feature granularities, thereby reducing the modal differences between content features and achieving better content retrieval results.

BRIEF DESCRIPTION OF THE DRAWINGS

FIG. 4 is another schematic flowchart of a model training method according to an embodiment of this application.

FIG. 7 is a schematic flowchart of a content retrieval method according to an embodiment of this application.

FIG. 8 is a schematic diagram of a structure of a model training apparatus according to an embodiment of this application.

FIG. 9 is a schematic diagram of another structure of a model training apparatus according to an embodiment of this application.

DESCRIPTION OF EMBODIMENTS

The technical solutions in embodiments of this application are clearly and completely described in the following with reference to the accompanying drawings in embodiments of this application. Apparently, the described embodiments are merely some rather than all of embodiments of this application. All other embodiments obtained by a person skilled in the art based on embodiments of this application without creative efforts shall fall within the protection scope of this application.

Embodiments of this application provide a model training method and apparatus, a computer device, and a non-transitory computer-readable storage medium. Specifically, the method provided in embodiments of this application is applicable to a model training apparatus in a first computer device, and to a content retrieval apparatus in a second computer device. The first computer device may be a device such as a server or a terminal, and the second computer device may be a device such as a server, a terminal, or the like. Specifically, the server may be an independent physical server, may also be a server cluster or distributed system composed of a plurality of physical servers, and may also be a cloud server providing basic cloud computing services, such as a cloud service, a cloud database, cloud computing, a cloud function, cloud storage, a network service, cloud communication, a middleware service, a domain name service, a security service, a CDN, and a big data and artificial intelligence platform. The terminal may include but is not limited to a mobile phone, a computer, an intelligent speech interaction device, a smart home appliance, a vehicle-mounted terminal, an aircraft, and the like. The terminal and the server may be directly or indirectly connected in a wired or wireless communication manner. This is not limited in this application.

For example, the model training apparatus may be deployed in the terminal or may be deployed in the server; and the content retrieval apparatus may be deployed in the terminal or may be deployed in the server.

In embodiments of this application, an example in which the first computer device is used as the server and the second computer device is used as the server is used, to introduce the model training method and the content retrieval method.

Figure 1:
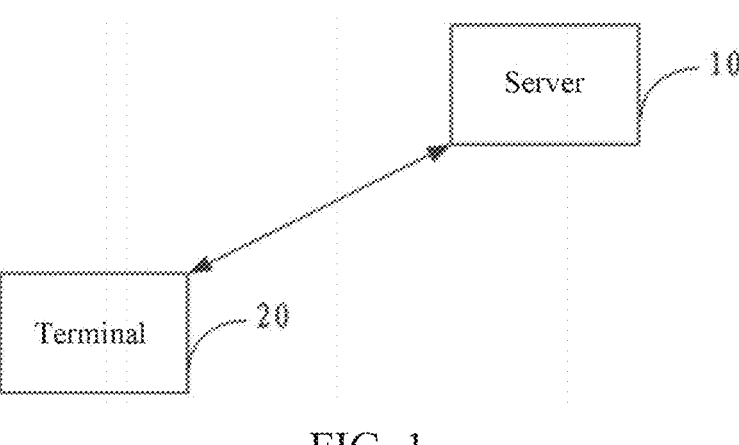
FIG. 1 is a schematic diagram of a scenario of a model training method according to an embodiment of this application.

Refer to FIG. 1, when performing the model training method, the server 10 may obtain sample retrieval content and sample retrieval result content that matches the sample retrieval content. Further the server 10 may perform, through a content retrieval model, feature extraction processing on the sample retrieval content and the sample retrieval result content, to obtain feature information of a plurality of different feature granularities, where the feature information includes a retrieval content feature and a retrieval result content feature; perform, through the content retrieval model, feature quantification processing on the retrieval content feature and the retrieval result content feature, to obtain quantified feature information of each feature granularity; calculate, based on the feature information and the quantified feature information, a retrieval semantic loss corresponding to each feature granularity; and perform model training on the content retrieval model based on the retrieval semantic loss corresponding to each feature granularity, thereby obtaining a trained content retrieval model.

As an example, in actual application, the trained content retrieval model may be deployed on the server 10. The server 10 may obtain to-be-retrieved content sent by the terminal 20, and determine retrieval result content corresponding to the to-be-retrieved content through the trained content retrieval model, so that the terminal 20 may correspondingly display the retrieval result content, thereby implementing a content retrieval function.

When performing the content retrieval method, the server 10 may obtain the to-be-retrieved content. For example, the terminal 20 may send the to-be-retrieved content to the server 10. Further, the server 10 may perform feature extraction processing on the to-be-retrieved content through the trained content retrieval model, to obtain a plurality of to-be-retrieved content features of different feature granularities; calculate, based on the to-be-retrieved content feature of each feature granularity, a similarity corresponding to the to-be-retrieved content and candidate retrieval result content at each feature granularity; and determine, based on the similarity corresponding to each feature granularity, retrieval result content corresponding to the to-be-retrieved content. In actual application, the server 10 may send the retrieval result content corresponding to the to-be-retrieved content to the terminal 20.

Detailed descriptions are separately performed below. A description order of the following embodiments is not construed as a limitation on a preferred order of the embodiments.

Figure 2:
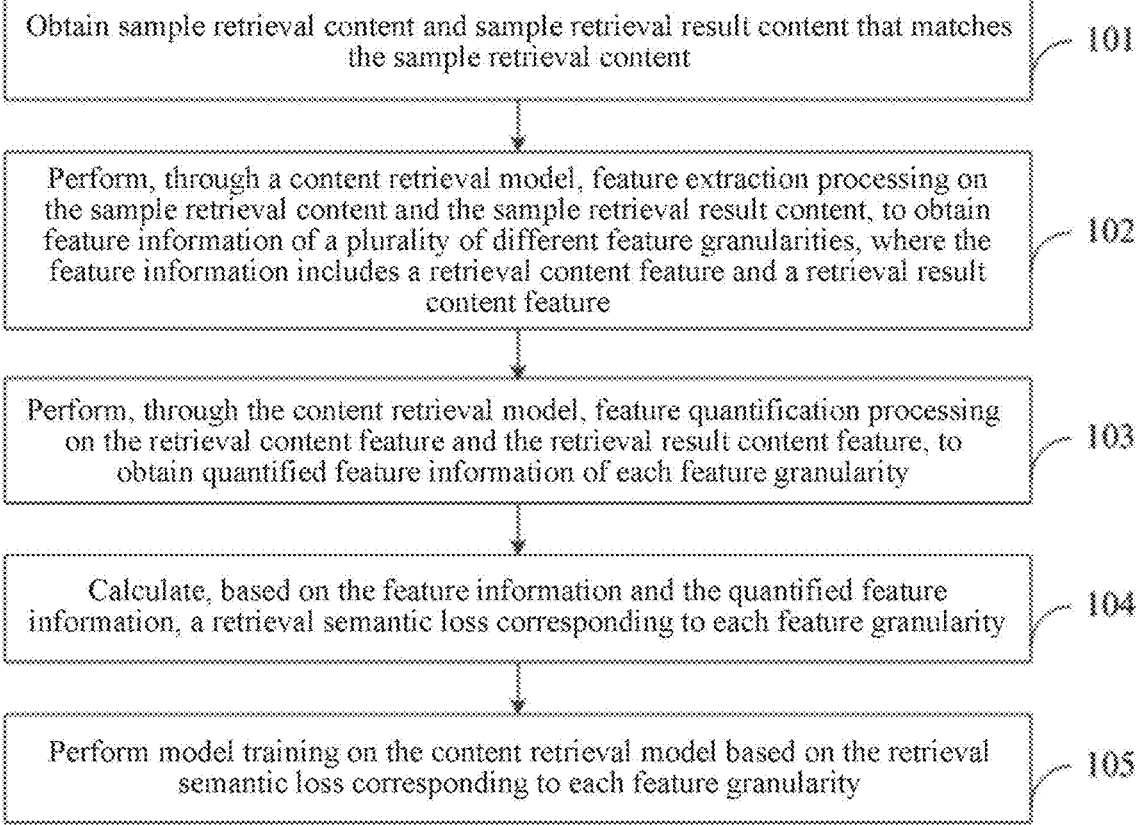
FIG. 2 is a flowchart of a model training method according to an embodiment of this application.

Embodiments of this application provide a model training method. The method may be independently performed by a terminal or a server, or jointly performed by a terminal and a server; and in embodiments of this application, an example in which the model training method is performed by the server is used for description. Specifically, the model training method is performed by the model training apparatus integrated in the server. As shown in FIG. 2, a specific process of the model training method may be as follows:

101: Obtain sample retrieval content and sample retrieval result content that matches the sample retrieval content.

The sample retrieval content refers to sample data corresponding to retrieval content. Correspondingly, the sample retrieval result content refers to sample data corresponding to retrieval result content. The content may include text content, image content, video content, audio content, link content, and the like; and for another example, the content may be obtained by combining a plurality of types of content, such as page content obtained by combining the text content and the image content, advertising content, and the like.

For example, a content retrieval scenario may include retrieving the video content based on the text content, retrieving the image content based on the text content, retrieving the web page content based on the text content, and the like. As an example, in an application scenario of retrieving the video content based on the text content, the retrieval content is the text content, and the video content that matches the text content is the retrieval result content that matches the retrieval content.

In this application, a content mode corresponding to the sample retrieval result content may have a plurality of cases, for example, may include at least one of the content modes such as an image, a video, a web page, and an audio. Similarly, the content mode corresponding to the sample retrieval content may also have a plurality of cases.

The content mode refers to a mode to which the content belongs. Specifically, the mode refers to an existence form of data, for example, file formats such as a text, an audio, an image, a video, and the like. Some data exists in different forms, but all describes the same object (such as the same thing or event). A requirement for information retrieval is often not just data in a single mode of the same object, and data in other modes may also be required to enrich understanding of the same object. In this case, cross-modal retrieval is required to implement retrieval between different mode data.

In an embodiment, the sample retrieval content and the sample retrieval result content may correspond to different content modes. In this way, a model for implementing cross-modal content retrieval may be trained in the model training method described in this application. For example, the content mode corresponding to the sample retrieval content may be the text, and the content mode corresponding to the sample retrieval result content may be in a plurality of cases such as an image, a video, a web page, and the like.

In this application, there are a plurality of manners to obtain the sample retrieval content and the sample retrieval result content that matches the sample retrieval content. For example, the server may receive the sample data sent by the terminal or other servers. The sample data may specifically include the sample retrieval content and the sample retrieval result content that matches the sample retrieval content. For another example, the server may store a sample data set. The sample data set may include the sample retrieval content required for model training and the sample retrieval result content that matches the sample retrieval content.

As an example, an example in which the content retrieval scenario is specifically retrieving the video content based on the text content is used, and the server may obtain a training sample pair set. The training sample pair set may include at least one training sample pair, and each training sample pair may include sample text content and sample video content that matches the sample text content. Specifically, each training sample pair may include a query text and a video that matches the query text.

102: Perform, through a content retrieval model, feature extraction processing on the sample retrieval content and the sample retrieval result content, to obtain feature information of a plurality of different feature granularities, where the feature information includes a retrieval content feature and a retrieval result content feature.

The content retrieval model is a neural network model configured to implement content retrieval. In this application, the content retrieval model may be specifically a to-be-trained model. Specifically, model training may be performed on the content retrieval model based on the sample retrieval content and the sample retrieval result content, so that the trained content retrieval model may be put into actual application, to retrieve retrieval result content that matches retrieval content provided by a user.

As an example, the content retrieval model may include a plurality of functional modules, and each functional module may be configured to implement different functions. Content retrieval may be implemented by combining the plurality of functional modules.

Feature extraction may start from an initial set of measurement data, and build derived values (features) designed to provide information and are non-redundant, thereby facilitating subsequent learning and generalization steps, and in some cases, leading to better interpretability. Related features that represent the content may be obtained through performing feature extraction on the content.

A feature granularity is a granularity configured to describe features. By performing feature extraction on the content, related features that represent the content may be obtained. For example, the feature granularity may be divided based on a content range involved in feature extraction of the content, and the feature granularity may be divided into a coarse granularity and a fine granularity. When feature extraction is performed based on global information of the content, an extracted feature may be determined as a coarse-grained feature; and when feature extraction is performed based on local information of the content, an extracted feature may be determined as a fine-grained feature.

As an example, an example in which to-be-extracted content is specifically a text is used. When feature extraction is performed based on global information of the text, a global feature that represents the text is obtained, the feature may be determined as the coarse-grained feature, or referred to as a global feature; and when feature extraction is performed based on local information (such as word segmentation in the text) of the text, and a local feature that represents the text is obtained, the feature may be determined as the fine-grained feature, or referred to as a local feature.

As another example, an example in which to-be-extracted content is specifically a video is used. When feature extraction is performed based on global information of the video, a global feature that represents the video is obtained, the feature may be determined as the coarse-grained feature, or referred to as a global feature; and when feature extraction is performed based on the local information (such as information corresponding to different modes of the video) of the video, and a local feature that represents the video is obtained, the feature may be determined as the fine-grained feature, or referred to as a local feature.

The retrieval content feature is a feature obtained by performing feature extraction processing on the sample retrieval content. In this application, feature extraction processing may be performed on the sample retrieval content through the content retrieval model, to obtain retrieval content features of a plurality of different feature granularities of the sample retrieval content.

The retrieval result content feature is a feature obtained by performing feature extraction processing on the sample retrieval result content. In this application, feature extraction processing may be performed on the sample retrieval result content through the content retrieval model, to obtain retrieval result content features of a plurality of different feature granularities of the sample retrieval result content.

In an embodiment, the coarse granularity may be used as an example, and the content retrieval model performs feature extraction processing on the sample retrieval result content, to obtain a coarse-grained retrieval result content feature of the sample retrieval result content. Specifically, the content retrieval model may include a feature extraction module corresponding to coarse-grained feature extraction performed on the sample retrieval result content, namely, a first coarse-grained feature extraction module. Specifically, the step "performing, through a content retrieval model, feature extraction processing on the sample retrieval result content" may include:

obtaining a modal content feature corresponding to at least one content mode of the sample retrieval result content;

separately performing, through the first coarse-grained feature extraction module, feature encoding processing on the modal content feature based on a self-attention mechanism, to obtain an encoded feature corresponding to each content mode; and performing feature aggregation processing on the encoded feature corresponding to each content mode, to obtain a coarse-grained retrieval result content feature of the sample retrieval result content.

The modal content feature corresponding to the sample retrieval result content in a specific content mode refers to a feature obtained by performing feature extraction processing on data corresponding to the sample retrieval result content in the content mode.

As an example, the modal content feature corresponding to the at least one content mode of the sample retrieval result content may be obtained by performing preprocessing on the sample retrieval result content.

An example in which the sample retrieval result content is specifically a video is used. Preprocessing may be performed on the video, to obtain a modal content feature corresponding to the video in a plurality of content modes. For example, specifically, features of 30 frames of image may be obtained by evenly sampling from the video, speech features of the video, text features of the video that are transcribed based on optical character recognition (OCR), and text features of the video transcribed based on automatic speech recognition (ASR) technology, and the like.

The first coarse-grained feature extraction module may be configured to perform coarse-grained feature extraction processing on the sample retrieval result content, to obtain the coarse-grained retrieval result content feature of the sample retrieval result content.

As an example, the modal content feature corresponding to the at least one content mode of the sample retrieval result content may be used as input data of the first coarse-grained feature extraction module, to pass through the first coarse-grained feature extraction module. Based on the modal content feature corresponding to the at least one content mode of the sample retrieval result content, the coarse-grained retrieval result content feature of the sample retrieval result content is generated.

An attention mechanism mimics an internal process of a biological observation behavior, namely, a mechanism that aligns internal experience with external sensations to increase precision of observation in some areas. The self-attention mechanism is an improvement of the attention mechanism, which reduces dependence on external information, and is better at capturing internal correlation of data or features.

Feature encoding processing is configured for using features as input data, and extracting representation information in the features in a manner of encoding. In this application, based on the self-attention mechanism, feature encoding processing may be performed on at least one modal content feature of the sample retrieval result content, to further extract representation information in each modal content feature. The representation information may be specifically represented as encoded features obtained after feature encoding processing.

Feature aggregation processing is configured for performing aggregation on a plurality of features, to obtain a comprehensive representation of the plurality of features. Feature aggregation processing may be implemented in a plurality of manners, for example, may be obtained by performing weighting processing on the features. In this application, feature aggregation processing may be performed on an encoded feature corresponding to each content mode of the sample retrieval result content, and an aggregated feature may be used as a coarse-grained retrieval result content feature of the sample retrieval result content. In this way, the coarse-grained retrieval result content feature that represent a global feature of the sample retrieval result content may be extracted by combining feature data corresponding to a plurality of content modes of the sample retrieval result content.

Figure 3:
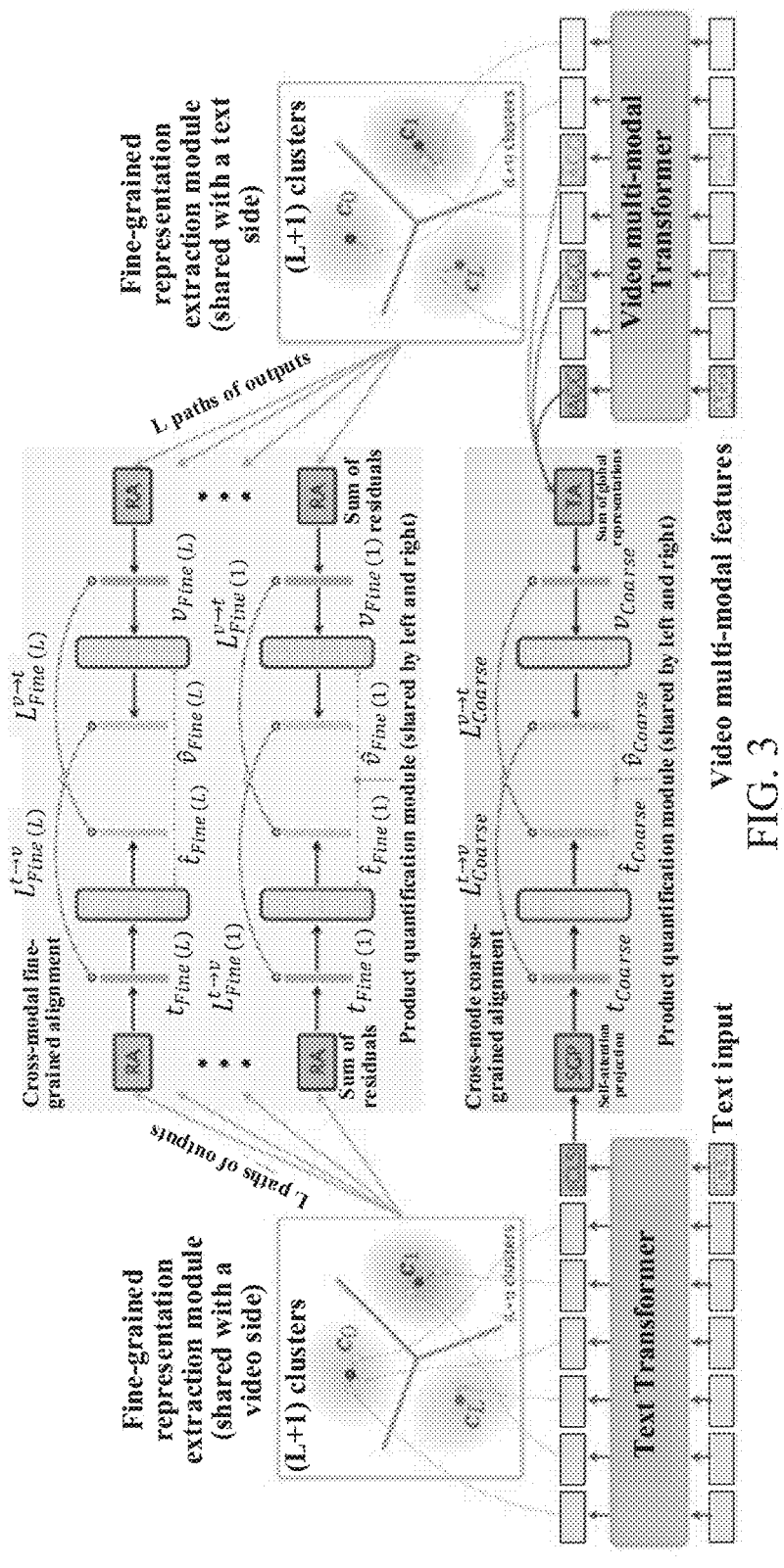
FIG. 3 is a schematic diagram of a model architecture of a model training method according to an embodiment of this application.

As an example, an example in which the sample retrieval result content is specifically a video is used, and the first coarse-grained feature extraction module may be a functional module implemented based on an encoder in a Transformer model. Referring to FIG. 3, multi-modal video features obtained by performing preprocessing on the video may be obtained. For example, features of the 30 frames of images that are evenly sampled from the video, the speech features of the video, and the text features of the video that are transcribed based on OCR and ASR are collected. In addition, an embedding vector of a special identifier (for example, may be recorded as "[AGG]") is inserted for modal information aggregation at the end of a feature sequence of each content mode, to form a sequence of feature embedding vectors. For each feature, a position encoding vector and a modal identifier vector may be added, and then a four-layer Transformer model may be input for encoding. The position encoding vector may be configured to capture timing information, position information, and the like corresponding to the feature.

In this example, in other words, the first coarse-grained feature extraction module may further generate a vector $$e^v_{[AGG]_1}, e^v_{[AGG]_2}, \cdots e^v_{[AGG]_E}$$

corresponding to the "[AGG]" identifier and the output $$e^v_1, e^v_2, \ldots, e^v_N$$

corresponding to each modal content feature, where E refers to a quantity of content modes of the sample retrieval result content, for example, in this example, E is a quantity of content modes, namely, 3 (an image, a speech, and a text) corresponding to the video; N refers to a quantity of modal content features, such as in this example, N is a quantity of modal content features, namely, 33 (30 image features, 1 speech feature, and 2 text features) corresponding to the video; and v is used as a distinguishing identifier corresponding to the video (English: video). The feature vector $$e^v_{[AGG]_1}, e^v_{[AGG]_2}, \cdots e^v_{[AGG]_E}$$

in this example is the encoded feature corresponding to each content mode of the video.

In this example, further, the first coarse-grained feature extraction module may perform feature aggregation processing on the encoded feature corresponding to each content mode, for example, perform feature averaging processing:

$$v_{Coarse} = \frac{1}{E}\sum_{i=1}^{E} e^v_{[AGG]_i}$$

on the feature vector $$e^v_{[AGG]_1}, e^v_{[AGG]_2}, \cdots e^v_{[AGG]_E}$$

corresponding to the "[AGG]" identifier, thereby obtaining a global representation feature $v_{Coarse}$ of the video, that is, a coarse-grained retrieval result content feature.

In an embodiment, the coarse granularity may be used as an example, and the content retrieval model performs feature extraction processing on the sample retrieval content, to obtain a coarse-grained retrieval content feature of the sample retrieval content. Specifically, the content retrieval model may include a feature extraction module corresponding to coarse-grained feature extraction performed on the sample retrieval content, namely, a second coarse-grained feature extraction module. Specifically, the step "performing, through a content retrieval model, feature extraction processing on the sample retrieval content" may include:

extracting a semantic representation feature of the sample retrieval content through the second coarse-grained feature extraction module; and performing feature projection processing on the semantic representation feature based on a self-attention mechanism, to obtain a coarse-grained retrieval content feature of the sample retrieval content.

The semantic representation feature of the sample retrieval content refer to the extracted semantic representation feature of the sample retrieval content.

The second coarse-grained feature extraction module may be configured to perform coarse-grained feature extraction processing on the sample retrieval content, to obtain a coarse-grained retrieval content feature of the sample retrieval content.

As an example, the sample retrieval content may be used as input data of the second coarse-grained feature extraction module, to pass through the second coarse-grained feature extraction module, and generate the coarse-grained retrieval content feature of the sample retrieval content.

Feature projection processing is a type of feature extraction. Feature projection may convert data of features in high-dimensional space into data in low-dimensional space. The data conversion may be linear or nonlinear. In this application, feature projection processing may be performed on the semantic representation feature of the sample retrieval content based on the self-attention mechanism, and then the data in the high-dimensional space during processing of the semantic representation feature may be converted into the data in the low-dimensional space, thereby obtaining the coarse-grained retrieval content feature of the sample retrieval content.

As an example, an example in which the sample retrieval content is specifically a text may be used as an example, and the second coarse-grained feature extraction module may be a functional module implemented based on the encoder in the Transformer model. Specifically, the second coarse-grained feature extraction module may include a transformer-based bidirectional encoder representation from transformer (BERT) and a self-attention projection module. The BERT model is a text Transformer pre-training model. The self-attention projection module may be configured to implement feature projection processing based on the self-attention mechanism.

In this example, referring to FIG. 3, a query text may be input into the second coarse-grained feature extraction module. Specifically, a special identifier "[CLS]" may be spliced into a text header, the spliced text is recorded as T, and T may be input into a pre-trained BERT model, to obtain a feature vector embedding $$e^t_{[CLS]}$$

corresponding to the special identifier "[CLS]", and a word vector sequence $$e^t_1, e^t_2, \ldots, e^t_N$$

of the segmented word included in the text, where N refers to a quantity of segmented words in the text, and t is used as a distinguishing identifier corresponding to the text (English: text). The feature vector $$e^t_{[CLS]}$$

in this example is a semantic representation feature of the query text.

In this example, the second coarse-grained feature extraction module may further perform feature projection processing on the semantic representation feature based on the self-attention mechanism, to obtain the coarse-grained retrieval content feature of the sample retrieval content. Specifically, the second coarse-grained feature extraction module may be spliced by the Bert model and several linear projection layers (it may be assumed that a quantity of linear projection layers is k, where k is a positive integer). After obtaining the semantic representation feature extracted through the Bert model, the self-attention projection module may further perform a weighted summation on output of k linear projection layers, and use the weighted summation result as a global representation feature of the query text, namely, the coarse-grained retrieval content feature, where a calculation manner of the weighted score is implemented based on the self-attention mechanism. Specifically, the coarse-grained retrieval content feature $t_{Coarse}$ of the query text may be obtained from the semantic representation feature $$e^t_{[CLS]}$$

of the query text through self-attention projection, namely, $$t_{Coarse} = \sum\nolimits_{k=1}^{K} a_k \cdot \phi_k(e^t_{[CLS]}),$$

where $\phi_k$ represents a $k^{th}$ linear projection layer. A weighted score $$a_k = \frac{\exp(w_k^T e^t_{[CLS]})}{\sum\nolimits_{k'=1}^{K} \exp(w_{k'}^T e^t_{[CLS]})},$$

where $\alpha_k$ refers to a weight of output of the $k^{th}$ linear projection layer in the summation, $$w_k^T$$

is a to-be-trained model parameter, and exp( ) is an exponential function.

In an embodiment, the fine granularity may be used as an example, and the content retrieval model may include a fine-grained feature extraction module. The fine-grained feature extraction module may be configured to perform fine-grained feature extraction on the sample retrieval content, to obtain a fine-grained retrieval content feature of the sample retrieval content. In addition, the fine-grained feature extraction module may also be configured to perform fine-grained feature extraction on the sample retrieval result content, to obtain the fine-grained retrieval result content feature of the sample retrieval result content. In other words, the content retrieval model may include a fine-grained feature extraction module shared by the sample retrieval content and the sample retrieval result content. Specifically, the step "performing, through a content retrieval model, feature extraction processing on the sample retrieval content and the sample retrieval result content, to obtain feature information of a plurality of different feature granularities" may include:

obtaining a plurality of to-be-clustered content features of the sample retrieval content and the sample retrieval result content;
    performing feature clustering processing on the to-be-clustered content features through the fine-grained feature extraction module; and
    determining feature information of a plurality of different fine granularities based on a clustering result of the feature clustering processing, where the feature information includes the retrieval content feature and the retrieval result content feature.

The fine-grained feature extraction module may be configured to extract the fine-grained feature of the content. In this application, the fine-grained feature extraction module may be shared by a sample retrieval content side and a sample retrieval result content side. In other words, the fine-grained feature extraction module may be configured to perform fine-grained feature extraction on the sample retrieval content, to obtain a fine-grained retrieval content feature of the sample retrieval content. In addition, the fine-grained feature extraction module may also be configured to perform fine-grained feature extraction on the sample retrieval result content, to obtain the fine-grained retrieval result content feature of the sample retrieval result content.

The fine-grained feature extraction module may implement fine-grained feature extraction in a plurality of manners. For example, the fine-grained feature extraction may be implemented based on a clustering processing mechanism, where clustering refers to a process of dividing a collection of physical or abstract objects into a plurality of classes including similar objects.

The sample retrieval content is used as an example, and a plurality of to-be-clustered content features of the sample retrieval content may be obtained. In addition, feature clustering processing is performed on the to-be-clustered content features through the fine-grained feature extraction module; and based on a clustering result, a plurality of different fine-grained retrieval content features of the sample retrieval content are determined. The sample retrieval result content is used as an example, and similarly a plurality of to-be-clustered content features of the sample retrieval result content may be obtained. In addition, feature clustering processing is performed on the to-be-clustered content features through the fine-grained feature extraction module; and based on the clustering result, a plurality of different fine-grained retrieval result content features of the sample retrieval result content are determined.

Feature clustering processing refers to a process of performing clustering on the to-be-clustered content features. Feature clustering processing may be implemented in a plurality of manners. For example, feature clustering processing may be implemented by using a clustering algorithm including parameters. The meaning of including parameters is that, unlike the common K-means clustering algorithm (kmeans), the clustering algorithm has model parameters (such as a clustering center) that may be trained.

As an example, an example in which fine-grained feature extraction may be performed on the sample retrieval content through the fine-grained feature extraction module, to obtain the fine-grained retrieval content feature of the sample retrieval content, and the sample retrieval content is specifically the query text is used. Then a plurality of to-be-clustered content features of the sample retrieval content may be obtained. For example, a word vector sequence $$e_1^t, e_2^t, \ldots, e_N^t$$

of segmented words included in the query text obtained in a process of performing feature extraction on the query text by the second coarse-grained feature extraction module may be used as the to-be-clustered content features of the query text.

In this example, through the fine-grained feature extraction module, when performing feature clustering processing on the to-be-clustered content features, semantic space including L+1 clustering centers $C_0, C_1, \ldots, C_L$ may be first established. Further, a proportional coefficient that each to-be-clustered content feature is to be assigned to each clustering center may be calculated. In other words, the proportional coefficient that each vector in the word vector sequence is to be assigned to each clustering center may be calculated.

$$e_i^t$$

is used as an example, and a proportional coefficient that $$e_i^t$$

is assigned to an $l^{th}$ clustering center is recorded as $$d_{i,l}^t,$$

and $$d_{i,l}^t = \frac{\exp(c_l^T e_i^t)}{\sum_{l'=0}^{L} \exp(c_{l'}^T e_i^t)}$$

may be set. In this way, a probability that an $i^{th}$ segmented word vector $$e_i^t$$

of the query text belongs to an $l^{th}$ clustering center $c_l$ may be determined by calculating $$d_{i,l}^t,$$

and the probability is used as a corresponding weight score.

An example in which the video content is retrieved based on the text content is used. Because the fine-grained feature extraction module is shared by a text side and a video side, each clustering center may be configured for representing a semantic concept, such as "sports", "education", "entertainment", and the like. Because the entire semantic space includes these clustering centers, by clustering the to-be-clustered content features on the video side and the text side in the semantic space, a representation of different "semantic concepts" of a query text (or a video) may be extracted through training.

In this example, after calculating all segmented word vectors in the word vector sequence and assigning the segmented word vectors to each clustering center with a weight, the fine-grained feature extraction module may further determine retrieval content features of a plurality of different fine granularities of the sample retrieval content based on the clustering result. For example, the fine-grained feature extraction module may determine a sum of residuals collected by each clustering center, and then determine fine-grained features of the plurality of different fine granularities of the query text, namely, retrieval content features of the plurality of different fine granularities of the sample retrieval content. Specifically, the $l^{th}$ clustering center $c_l$ is used as an example, and the sum of the residuals collected by the $l^{th}$ clustering center $c_l$ may be recorded as $$r_l^t,$$

and $$r_l^t = \sum_{i=1}^{N} d_{i,l}^t \cdot (e_i^t - c_l)$$

may be set In this way, the plurality of fine-grained features of the query text may be determined based on a calculation result of $$r_l^t,$$

that is, $$r_l^t$$

is determined as the $l^{th}$ fine-grained representation on the text side.

An example in which the video content is retrieved based on the text content is used. Because $$r_l^t$$

is a feature vector that represents the sum of residuals, a representation of a query text on a specific semantic concept (represented by the clustering center) may be represented through $$r_l^t.$$

15
16

Through training, the content retrieval model learns to preserve semantic information by using the residual. In addition, because each $$r_i^t$$

extracts information of a single semantic concept rather than the overall semantic information, $$r_i^t$$

may be determined as a fine-grained representation, namely, a retrieval content feature of the sample retrieval content in a fine granularity.

In addition, in actual application, to avoid a decrease in accuracy caused by noise interference, when the fine-grained feature extraction module implements fine-grained privilege extraction, a cluster No. 0 may be designated as a noise collection cluster. A function of the cluster No. 0 is to aggregate some noise information that does not include semantics in the sequence, for example, information such as definite articles in the text, the background in the video, and the like. The sum of the residuals generated by the cluster is discarded. In this way, output of the fine-grained representation extraction module is L fine-grained features, namely, $$r_1^t, r_2^t, \ldots, r_L^t.$$

An example in which the video content is retrieved based on the text content is used. In a training process, information that the cluster No. 0 is always discarded may be set, and only a cluster No. 1 to a cluster No. l are used to align a text and a video. In this way, through a backpropagation step in the model training process, the content retrieval model learns to classify the noise information into the cluster No. 0, and collect useful semantic information in the cluster No. 1 to the cluster No. L.

In this application, because the fine-grained feature extraction module may be shared by a sample retrieval content side and a sample retrieval result content side, and the fine-grained feature extraction module may specifically determine a plurality of pieces of different fine-grained feature information by performing feature clustering processing on the to-be-clustered content features. For details, refer to the above. Therefore, obtaining of a plurality of to-be-clustered content features of the sample retrieval result content, and obtaining of a plurality of to-be-clustered content features of the sample retrieval content may be described below.

In an embodiment, based on the modal content features corresponding to different content modes of the sample retrieval result content, the to-be-clustered content features of the sample retrieval result content may be determined. Specifically, the step "obtaining of a plurality of to-be-clustered content features of the sample retrieval result content" may include:

determining at least one content mode of the sample retrieval result content;

extracting the sample retrieval result content and the modal content feature corresponding to the content mode; and determining the plurality of to-be-clustered content features of the sample retrieval result content according to the modal content feature.

An example in which the sample retrieval result content is specifically a video is used, and a content mode of the sample retrieval result content may include a picture, a text, an audio, and the like. Correspondingly, picture features corresponding to several frames in the video may be extracted, speech features corresponding to the video may be extracted, and text features corresponding to the video may be extracted based on manners such as OCR or ASR.

For example, the modal content feature corresponding to the at least one content mode of the sample retrieval result content may be obtained by performing preprocessing on the sample retrieval result content.

According to the modal content feature, a plurality of to-be-clustered content features of the sample retrieval result content may be determined in a plurality of manners. For example, feature encoding processing may be performed on the modal content feature based on the self-attention mechanism, and the plurality of to-be-clustered content features of the sample retrieval result content may be selected from the obtained encoded feature.

For example, considering a process in which the first coarse-grained feature extraction module performs coarse-grained feature extraction on the sample retrieval result content includes the step of performing feature encoding processing on the modal content feature based on the self-attention mechanism, the plurality of to-be-clustered content features of the sample retrieval result content may be selected from the encoded feature obtained by performing, by the first coarse-grained feature extraction module, feature encoding processing on the modal content feature based on the self-attention mechanism.

As an example, an example in which the sample retrieval result content is specifically a video is used, and the first coarse-grained feature extraction module may perform feature encoding processing on the modal content feature based on the self-attention mechanism, and generate a vector $$e_{[AGG]_1}^y, e_{[AGG]_2}^y, \cdots e_{[AGG]_E}^y$$

corresponding to the "[AGG]" identifier and the output $$e_1^y, e_2^y, \cdots, e_N^y$$

corresponding to each modal content feature.

$$e_{[AGG]_1}^y, e_{[AGG]_2}^y, \cdots e_{[AGG]_E}^y$$

is the encoded feature corresponding to each content mode, which is specifically configured for generating the coarse-grained retrieval result content feature of the sample retrieval result content, and the output $$e_1^y, e_2^y, \cdots, e_N^y$$

17 18 corresponding to each modal content feature may be used as the plurality of to-be-clustered content features of the sample retrieval result content.

In an embodiment, based on sub-content features corresponding to different sub-content of the sample retrieval content, the to-be-clustered content features of the sample retrieval content may be determined. Specifically, the step "obtaining of a plurality of to-be-clustered content features in the sample retrieval content" may include:

performing content division processing on the sample retrieval content, to obtain at least one piece of sub-content of the sample retrieval content;

extracting a sub-content feature corresponding to the sub-content; and determining the plurality of to-be-clustered content features of the sample retrieval content according to the sub-content feature.

Content division processing refers to a processing manner of dividing content, to generate sub-content with a smaller granularity. For example, if the sample retrieval content is a text, word segmentation processing may be performed on the text, to obtain a segmented word with a smaller granularity than the text; and for another example, if the sample retrieval content is an image, image division may be performed on the image, to obtain a partial image with a smaller granularity than the image, and the like.

The sub-content feature corresponding to the sub-content may be obtained by performing feature extraction processing on the sub-content. For example, the sub-content feature may be specifically a semantic representation feature corresponding to the sub-content.

For example, considering a process in which the second coarse-grained feature extraction module performs coarse-grained feature extraction on the sample retrieval content includes the step of extracting a semantic representation feature of the sample retrieval content, the plurality of to-be-clustered content features of the sample retrieval content may be selected from the semantic representation feature of the sample retrieval content extracted by the second coarse-grained feature extraction module.

As an example, an example in which the sample retrieval content is specifically a text may be used as an example, and the second coarse-grained feature extraction module may extract the semantic representation feature of the sample retrieval content, specifically including a feature vector embedding $$e_{[CLS]}^t$$

corresponding to a special identifier "[CLS]", and a word vector sequence $$e_1^t, e_2^t, \cdots, e_N^t$$

of segmented words included in the text, where $$e_{[CLS]}^t$$

is the coarse-grained semantic representation feature of the query text, and the word vector sequence $$e_1^t, e_2^t, \cdots, e_N^t$$

of the segmented words is the fine-grained semantic representation feature of the query text. Therefore, the fine-grained semantic representation feature $$e_1^t, e_2^t, \cdots, e_N^t$$

of the query text may be used as the plurality of to-be-clustered content features of the sample retrieval content.

103: Perform, through the content retrieval model, feature quantification processing on the retrieval content feature and the retrieval result content feature, to obtain quantified feature information of each feature granularity.

Feature quantization processing is a processing method for performing encoding on a feature, which aims to streamline and compress the feature in a manner of encoding and generate a quantified feature of the feature, to ensure that the quantified feature may maintain a representation capability of the feature to the greatest extent.

In this application, similar to the fact that feature information may specifically include the retrieval content feature and the retrieval result content feature, the quantified feature information may specifically include a quantified retrieval content feature and a quantified retrieval result content feature.

In this application, after feature extraction processing is performed on the sample retrieval content through the content retrieval model, retrieval content features of a plurality of different feature granularities of the sample retrieval content may be obtained. For example, at least one coarse-grained retrieval content feature and at least one fine-grained retrieval content feature of the sample retrieval content may be obtained. Similarly, after feature extraction processing is performed on the sample retrieval result content through the content retrieval model, retrieval result content features of the plurality of different feature granularities of the sample retrieval result content may be obtained. For example, at least one coarse-grained retrieval result content feature and at least one fine-grained retrieval result content feature of the sample retrieval result content may be obtained.

Feature quantification processing performed on at least one coarse-grained retrieval content feature and at least one fine-grained retrieval content feature of the sample retrieval content, and at least one coarse-grained retrieval result content feature and at least one fine-grained retrieval result content feature of the sample retrieval result content may be implemented by setting up a plurality of independent feature quantization modules.

For example, referring to FIG. 3, an example in which after step 102, a coarse-grained retrieval content feature of the sample retrieval content is obtained by extraction, and a coarse-grained retrieval result content feature of the sample retrieval result content is obtained by extraction is used. A feature quantification module that is shared by the sample retrieval content and the sample retrieval result content and that is configured to perform feature quantification processing on the coarse-grained feature may be set. In addition, considering that when the content retrieval model performs fine-grained feature extraction, specifically, a fine-grained feature extraction module shared by the sample retrieval content and the sample retrieval result content may be configured to perform fine-grained feature extraction on the sample retrieval content and the sample retrieval result content, so that the sample retrieval content and the sample retrieval result content may have the same quantity of fine-grained features (it may be assumed that the quantity of fine-grained features is L, and L may be an integer greater than or equal to 1). Referring to FIG. 3, L feature quantification modules that are shared by the sample retrieval content and the sample retrieval result content, and that are configured to perform feature quantification processing on the fine-grained feature may be set.

In this way, the content retrieval model may specifically include L+1 independent feature quantification modules, which are separately configured to compress the coarse-grained feature and L fine-grained features. The feature quantification module at each level is shared by the sample retrieval content and the sample retrieval result content. In particular, when the sample retrieval content and the sample retrieval result content correspond to different content modes, the feature quantification module at each level is shared across modes by the sample retrieval content and the sample retrieval result content.

In an embodiment, considering that the content retrieval model may include a feature quantification module corresponding to each feature granularity, and each feature quantification module may be configured to perform feature quantification processing on feature information of the feature granularity corresponding to each feature quantification module, an example in which feature quantification processing is performed on the retrieval content feature on the sample retrieval content side through the feature quantification module may be used. Specifically, the step "performing, through the content retrieval model, feature quantification processing on the retrieval content feature" may include:

performing, for each feature granularity and through the feature quantification module corresponding to the feature granularity, feature division processing on a retrieval content feature corresponding to the feature granularity, to obtain a divided sub-retrieval content feature corresponding to the feature granularity;

separately performing feature quantification processing on the divided sub-retrieval content feature corresponding to the feature granularity, to obtain a quantified sub-retrieval content feature corresponding to the feature granularity; and performing feature fusion processing on each quantified sub-retrieval content feature corresponding to the feature granularity, to obtain the quantified retrieval content feature of each feature granularity.

Feature division processing refers to a process of dividing a feature into sub-features with smaller dimensions. For example, a D-dimensional feature may be divided into M sub-features through feature division processing, where each sub-feature is D/M-dimensional sub-feature, where both D and M are positive integers. For example, a 128-dimensional feature may be divided into 8 sub-features, where each sub-feature is a 16-dimensional sub-feature. Therefore, by performing feature division processing on the retrieval content feature, the divided sub-retrieval content features may be correspondingly obtained.

As an example, an example in which feature quantification processing may be performed on the coarse-grained retrieval content feature of the sample retrieval content is used. Specifically, an example in which the sample retrieval content may be used as a text, and the coarse-grained retrieval content feature of the sample retrieval content is $t_{Coarse}$, a dimension of $t_{Coarse}$ is D, and D=Md is met is used. Then the coarse-grained retrieval content feature $t_{Coarse}$ on the text side may be evenly divided into M segments according to dimensions, where each divided sub-retrieval content feature is a d-dimensional sub-retrieval content feature.

Further, to perform feature quantification processing on the divided sub-retrieval content feature through the feature quantification module, the feature quantification module may be set to specifically include M codebooks $C^1$, $C^2$, . . . , $C^M$, where each codebook may include K d-dimensional codeword vectors, for example, $C^m$ includes $$c_1^m, c_2^m, \cdots, c_K^m.$$

When feature quantification processing is performed on the divided sub-retrieval content features through the feature quantification module, feature quantification may be performed on an $m^{th}$ divided sub-retrieval content feature $$t_{Coarse}^m$$

by using $C^m$, to obtain a quantified sub-retrieval content feature $$\hat{t}_{Coarse}^m.$$

Specifically, $$\hat{t}_{Coarse}^m = \sum_{k=1}^{K} p_k^m c_i^m$$

may be set, where a weight coefficient $$p_k^m = \frac{\exp\left(c_k^{m^T} t_{Coarse}^m\right)}{\sum_{k'=1}^{K} \exp\left(c_{k'}^{m^T} t_{Coarse}^m\right)},$$

and the weight coefficient represents a classification probability, namely, a probability of the $m^{th}$ divided sub-retrieval content feature $$t_{Coarse}^m$$

that is represented by the $k^{th}$ codeword vector $$c_K^m$$

in the codebook $C^m$.

Feature fusion processing refers to a processing manner of fusing a plurality of features, to obtain fused features. Feature fusion processing may be implemented in a plurality of manners, for example, may be implemented through feature splicing (English abbreviation: concat), and for another example, may be implemented through feature addition (English abbreviation: add).

In this application, feature fusion processing may be performed on a quantified sub-retrieval content feature corresponding to the feature granularity, and the fused feature may be used as a quantified retrieval content feature of the feature granularity. For example, in the foregoing example, M quantified sub-retrieval content features may be spliced together in a manner of feature splicing, to implement feature fusion, and the obtained spliced feature $\hat{t}_{Coarse}$ may be used as a coarse-grained quantified retrieval content feature, namely, $\hat{t}_{Coarse}$, where concatenate( ) represents feature splicing processing.

In an embodiment, when feature quantification processing is performed on the retrieval result content feature on the sample retrieval result content side through the feature quantification module, for an implementation, refer to the above. An example in which feature quantification processing is performed on the retrieval content feature on the sample retrieval content side through the feature quantification module is used, and explanation of the step "performing, through the content retrieval model, feature quantification processing on the retrieval content feature" is provided. The step "performing, through the content retrieval model, feature quantification processing on the retrieval content feature and the retrieval result content feature" may include:

performing, for each feature granularity and through the feature quantification module corresponding to the feature granularity, feature division processing on a retrieval result content feature corresponding to the feature granularity, to obtain a divided sub-retrieval result content feature corresponding to the feature granularity; separately performing feature quantification processing on the divided sub-retrieval result content feature corresponding to the feature granularity, to obtain a quantified sub-retrieval result content feature corresponding to the feature granularity; and performing feature fusion processing on the quantified sub-retrieval result content feature corresponding to the feature granularity, to obtain the quantified retrieval result content feature of the feature granularity.

104: Calculate, based on the feature information and the quantified feature information, a retrieval semantic loss corresponding to each feature granularity.

The retrieval semantic loss refers to a model training loss that is used when performing training on the content retrieval model. Specifically, because the content retrieval model may be implemented based on a feature representing semantics in a process of implementing content retrieval, the model training loss in the model training process of the content retrieval model may be referred to as the retrieval semantic loss.

The retrieval semantic loss may be calculated in a plurality of manners. For example, the retrieval semantic loss may be calculated by using contrastive learning. For another example, the retrieval semantic loss may be calculated by using metric learning, and the like.

The feature information may include retrieval content features with different feature granularities of the sample retrieval content, and retrieval result content features with different feature granularities of the sample retrieval result content. For example, the retrieval content features with different feature granularities of the sample retrieval content may specifically include coarse-grained retrieval content features of the sample retrieval content, and a plurality of fine-grained retrieval content features of the sample retrieval content; and similarly, the retrieval result content features with different feature granularities of the sample retrieval result content may specifically include coarse-grained retrieval result content features of the sample retrieval result content, and a plurality of fine-grained retrieval result content features of the sample retrieval result content.

The quantified feature information may include quantified retrieval content features with different feature granularities of the sample retrieval content, and quantified retrieval result content features with different feature granularities of the sample retrieval result content. For example, the quantified retrieval content features with different feature granularities of the sample retrieval content may specifically include coarse-grained quantified retrieval content features of the sample retrieval content, and a plurality of fine-grained quantified retrieval content features of the sample retrieval content; and similarly, the quantified retrieval result content features with different feature granularities of the sample retrieval result content may specifically include coarse-grained quantified retrieval result content features of the sample retrieval result content, and a plurality of fine-grained quantified retrieval result content features of the sample retrieval result content.

In this application, when calculating the retrieval semantic loss of the content retrieval model, although the content retrieval model is specifically configured to retrieve matching sample retrieval result content based on the sample retrieval content, considering that the content retrieval model specifically performs feature analysis on the sample retrieval content side and the sample retrieval result content side, when calculating the retrieval semantic loss of the content retrieval model, a first semantic retrieval direction that represents performing semantic retrieval from the sample retrieval content to the sample retrieval result content, and a second semantic retrieval direction that represents performing semantic retrieval from the sample retrieval result content to the sample retrieval content may be taken into account, and the semantic retrieval loss of the content retrieval model is determined based on a first retrieval semantic loss corresponding to the first semantic retrieval direction and a second retrieval semantic loss corresponding to the second semantic retrieval direction. In this way, the limited sample data may be fully utilized, to improve semantic retrieval precision of the content retrieval model through two-way semantic retrieval training. Specifically, the step "calculating, based on the feature information and the quantified feature information, a retrieval semantic loss corresponding to each feature granularity" may include:

calculating, based on the feature information and the quantified feature information, a first retrieval semantic loss of each feature granularity in a first semantic retrieval direction, and a second retrieval semantic loss of each feature granularity in a second semantic retrieval direction;

performing loss aggregation processing on the first retrieval semantic loss and the second retrieval semantic loss; and determining, according to a processing result of the loss aggregation processing, the retrieval semantic loss corresponding to each feature granularity.

The first semantic retrieval direction represents a direction of performing semantic retrieval from the sample retrieval content to the sample retrieval result content. Correspondingly, the retrieval semantic loss that is calculated based on the first semantic retrieval direction may be referred to as the first retrieval semantic loss.

The second semantic retrieval direction represents a direction of performing semantic retrieval from the sample retrieval result content to the sample retrieval content. Correspondingly, the retrieval semantic loss that is calculated based on the second semantic retrieval direction may be referred to as the second retrieval semantic loss.

As an example, an example in the which video content is retrieved based on the text content, that is, the sample retrieval content is specifically a text, the sample retrieval result content is specifically a video, the feature granularity is specifically a coarse granularity, and the retrieval semantic loss is calculated by using contrastive learning is used. The retrieval semantic loss from the text side to the video side may be recorded as $$L_{Coarse}^{t \to v},$$

namely, the first retrieval semantic loss, and the retrieval semantic loss from the video side to the text side may be recorded as $$L_{Coarse}^{v \to t},$$

namely, the second retrieval semantic loss.

Loss aggregation processing performed on the first retrieval semantic loss and the second retrieval semantic loss refers to a processing method for performing data aggregation on the first retrieval semantic loss and the second retrieval semantic loss that are obtained by calculation. Specifically, a manner of performing data aggregation may include calculating an average value, summing, taking a maximum value, and the like. For example, loss aggregation processing may be performed on the first retrieval semantic loss $$L_{Coarse}^{t \to v}$$

and the second retrieval semantic loss $$L_{Coarse}^{v \to t}$$

that correspond to the coarse granularity in a manner of calculating an average value, thereby obtaining a retrieval semantic loss $L_{Coarse}$ corresponding to the coarse granularity, namely, $$L_{Coarse} = (L_{Coarse}^{t \to v} + L_{Coarse}^{v \to t})/2.$$

In an embodiment, the first semantic retrieval direction may be used as an example, to describe the calculating, based on the feature information and the quantified feature information, a first retrieval semantic loss of each feature granularity in a first semantic retrieval direction. Specifically, the step "calculating, based on the feature information and the quantified feature information, a first retrieval semantic loss of each feature granularity in a first semantic retrieval direction" may include:

according to the first semantic retrieval direction, determining a target feature from the feature information, and determining a target quantified feature from the quantified feature information, where the target feature and the target quantified feature correspond to different feature modes;

performing feature alignment processing on the target feature and the target quantified feature according to the feature granularity; and calculating the first retrieval semantic loss of each feature granularity in the first semantic retrieval direction based on a feature similarity between an aligned target feature and an aligned target quantified feature.

When calculating the first retrieval semantic loss in the first semantic retrieval direction, the retrieval content feature of the sample retrieval content in the feature information may be used as the target feature, and a quantified retrieval result content feature of the sample retrieval result content in the quantified feature information may be used as the target quantified feature. In particular, when the sample retrieval content and the sample retrieval result content correspond to different content modes, it may be considered that the target feature and the target quantified feature also correspond to different feature modes.

Specifically, for case of description and understanding, an example in which the feature granularity is specifically the coarse granularity may be used. In the example of retrieving the video content based on the text content, that is, the sample retrieval content is specifically a text, and the sample retrieval result content is specifically a video, a coarse-grained retrieval content feature of an $i^{th}$ sample text may be recorded as $t_{Coarse,i}$, namely, a target feature, and a coarse-grained quantified retrieval result content feature of the $i^{th}$ sample video may be recorded as $\hat{v}_{Coarse,i}$, namely, a target quantified feature. Because both $t_{Coarse,i}$ and Coarse,i are coarse-grained content features, it may be considered that $t_{Coarse,i}$ is an aligned target feature, and $\hat{v}_{Coarse,i}$ is an aligned target quantified feature.

A feature similarity between the aligned target feature $t_{Coarse,i}$ and the aligned target quantified feature $\hat{v}_{Coarse,i}$ may be recorded as $$s_{Coarse,ii}^{t \to v}.$$

The feature similarity may be calculated in a plurality of manners, for example, may be calculated through a cosine similarity, and $$s_{Coarse,ii}^{t \to v}$$

$=\cos(t_{Coarse,i}, \hat{v}_{Coarse,i})$, where $\cos(\cdot)$ represents a cosine similarity between vectors.

Further, a first retrieval semantic loss $$L_{Coarse}^{t \to v}$$

of a coarse granularity in the first semantic retrieval direction is calculated based on the feature similarity $$s_{Coarse,ii}^{t \to v}$$

between the aligned target feature $t_{Coarse,i}$ and the aligned target quantified feature $\hat{v}_{Coarse,i}$. For example, the first retrieval semantic loss may be calculated in a manner of contrastive learning, and there may be $$L_{Coarse}^{t \to v} = -\frac{1}{B} \sum_{i=1}^{B} \log \frac{\exp\left(s_{Coarse,ii}^{t \to v}/\tau\right)}{\sum_{j=1}^{B} \exp\left(s_{Coarse,ij}^{t \to v}/\tau\right)},$$

where $\tau > 0$ is a temperature hyperparameter in contrastive learning.

$$s_{Coarse,ij}^{t \to v}$$

represents a feature similarity between the coarse-grained retrieval content feature $t_{Coarse,i}$ of the $i^{th}$ sample text and a coarse-grained quantified retrieval result content feature $\hat{v}_{Coarse,j}$ of a $j^{th}$ sample video.

Similarly, the step "calculating, based on the feature information and the quantified feature information, a second retrieval semantic loss of each feature granularity in a second semantic retrieval direction" may include: according to the second semantic retrieval direction, determining a target feature from the feature information, and determining a target quantified feature from the quantified feature information, where the target feature and the target quantified feature correspond to different feature modes; performing feature alignment processing on the target feature and the target quantified feature according to the feature granularity; and calculating the second retrieval semantic loss of each feature granularity in the second semantic retrieval direction based on a feature similarity between an aligned target feature and an aligned target quantified feature.

When calculating the corresponding second retrieval semantic loss in the second semantic retrieval direction, the retrieval result content feature of the sample retrieval result content in the feature information may be used as the target feature, and the quantified retrieval content feature of the sample retrieval content in the quantified feature information may be used as the target quantified feature. In particular, when the sample retrieval content and the sample retrieval result content correspond to different content modes, it may be considered that the target feature and the target quantified feature also correspond to different feature modes.

Similarly, an example in which the feature granularity is specifically the coarse granularity may be used. In the example of retrieving the video content based on the text content, that is, the sample retrieval content is specifically a text, and the sample retrieval result content is specifically a video, a coarse-grained retrieval result content feature of an $i^{th}$ sample video may be recorded as $v_{Coarse,i}$, namely, a target feature, and a coarse-grained quantified retrieval content feature of the $i^{th}$ sample text may be recorded as $\hat{t}_{Coarse,i}$, namely, a target quantified feature. Because both $v_{Coarse,i}$ and $\hat{t}_{Coarse,i}$ are coarse-grained content features, it may be considered that $v_{Coarse,i}$ is an aligned target feature, and $\hat{t}_{Coarse,i}$ is an aligned target quantified feature.

Similarly, a feature similarity between the aligned target feature $v_{Coarse,i}$ and the aligned target quantified feature $\hat{t}_{Coarse,i}$ may be recorded as $$s_{Coarse,ii}^{v \to t}.$$

The feature similarity may be calculated in a plurality of manners, for example, may be calculated through a cosine similarity, and $$s_{Coarse,ii}^{v \to t}$$

$= COS(v_{Coarse,i}, \hat{t}_{Coarse,i})$, where $\cos(\cdot)$ represents a cosine similarity between vectors.

Further, a corresponding second retrieval semantic loss $$L_{Coarse}^{v \to t}$$

of a coarse granularity in the second semantic retrieval direction is calculated based on a feature similarity that is recorded as $$s_{Coarse,ii}^{v \to t}$$

and that is between the aligned target feature $v_{Coarse,i}$ and the aligned target quantified feature $\hat{t}_{Coarse,i}$. For example, the second retrieval semantic loss may be calculated in a manner of contrastive learning, and there may be $$L_{Coarse}^{v \to t} = -\frac{1}{B} \sum_{i=1}^{B} \log \frac{\exp\left(s_{Coarse,ii}^{v \to t}/\tau\right)}{\sum_{j=1}^{B} \exp\left(s_{Coarse,ij}^{v \to t}/\tau\right)},$$

where $\tau > 0$ is a temperature hyperparameter in contrastive learning.

$$s_{Coarse,ij}^{v \to t}$$

represents a feature similarity between the coarse-grained retrieval result content feature $v_{Coarse,i}$ of the $i^{th}$ sample video and a coarse-grained quantified retrieval content feature $\hat{t}_{Coarse,j}$ of a $j^{th}$ sample text.

The above only provides description for an example in which the feature granularity is specifically the coarse granularity. A manner of aligning features across modes at a fine-grained level, a manner of calculating the first retrieval semantic loss in the first semantic retrieval direction, and a manner of calculating the second retrieval semantic loss in the second semantic retrieval direction are similar to a manner of calculating the coarse granularity. For details, refer to the above.

Specifically, in this application, the fine-grained feature extraction module is shared by the sample retrieval content and the sample retrieval result content. In other words, a retrieval content feature 1 corresponding to a fine granularity 1 of the sample retrieval content, a retrieval content feature 2 corresponding to a fine granularity 2, . . . , and a retrieval content feature L corresponding to a fine granularity L may be extracted through the fine-grained feature extraction module; and a retrieval result content feature 1 corresponding to a fine granularity 1 of the sample retrieval result content, a retrieval result content feature 2 corresponding to a fine granularity 2, . . . , and a retrieval result content feature L corresponding to a fine granularity L may be extracted. Therefore, feature alignment processing may be performed on the retrieval content feature and the retrieval result content feature according to the feature granularity. Specifically, the retrieval content feature 1 may be aligned with the retrieval result content feature 1, the retrieval content feature 2 may be aligned with the retrieval result content feature 2, . . . , and the retrieval content feature L may be aligned with the retrieval result content feature L.

In other words, referring to the manner in the foregoing example, similarly, the retrieval semantic loss (L is a positive integer) based on contrastive learning may be separately calculated at L fine-grained levels, to obtain a retrieval semantic loss corresponding to each fine granularity, and the retrieval semantic loss is recorded as $L_{Fine(1)}$, $L_{Fine(2)}$, . . . , $L_{Fine(L)}$, where $L_{Fine(l)}=$ $$\left(L_{Fine(l)}^{t\rightarrow v} + L_{Fine(l)}^{v\rightarrow t}\right)/2, \text{ and } L_{Fine(l)}^{t\rightarrow v}$$

is the first retrieval semantic loss of the fine granularity l in the first semantic retrieval direction, and $$L_{Fine(l)}^{v\rightarrow t}$$

is the second retrieval semantic loss of fine granularity l in the second semantic retrieval direction.

105: Perform model training on the content retrieval model based on the retrieval semantic loss corresponding to each feature granularity.

Because in this application, feature extraction and feature quantification are performed on the sample retrieval content and sample retrieval result content from a plurality of different feature granularities, to obtain a retrieval semantic loss corresponding to each feature granularity, in order to be able to combine a semantic representation extracted from the plurality of different feature granularities and take into account retrieval semantic losses corresponding to the plurality of different feature granularities, the final retrieval semantic loss required to perform model training on the content retrieval model may be determined based on the retrieval semantic loss corresponding to each feature granularity, and then model training is performed on the content retrieval model according to the determined retrieval semantic loss.

For example, model training may be performed on the content retrieval model based on a backpropagation algorithm (BP) algorithm. The backpropagation algorithm is a learning algorithm suitable for multi-layer neuron networks, and is based on a gradient descent method. An input/output relationship of a BP network is essentially a mapping relationship: A function implemented by a BP neural network with n inputs and m outputs is continuous mapping from n-dimensional Euclidean space to a finite field in m-dimensional Euclidean space. The mapping is highly nonlinear. An information processing capability of the BP network is from a plurality of composites of simple nonlinear functions, and therefore, the BP network has a strong function reproduction capability.

In an embodiment, a granularity type of the feature granularity may include a coarse granularity and a fine granularity. For example, in the foregoing example, the granularity type of the feature granularity includes a total of L+1 feature granularities specifically ranging from 1 coarse granularity to L fine granularities (for example, a fine granularity 1, a fine granularity 2, . . . , and a fine granularity L), to perform feature extraction, feature quantification, and the like on the sample retrieval content and the sample retrieval result content. In addition, because content may be considered from a global scope in the coarse granularity, and content may be considered from different local scopes in different fine granularities, when determining the final retrieval semantic loss required for model training based on the retrieval semantic loss corresponding to each feature granularity, the granularity type of the feature granularity may be taken into account. Specifically, the step "performing model training on the content retrieval model based on the retrieval semantic loss corresponding to each feature granularity" may include:

performing, according to a granularity type of the feature granularity, loss aggregation processing on the retrieval semantic loss corresponding to each feature granularity; and performing model training on the content retrieval model based on an aggregated retrieval semantic loss.

For example, the granularity type of the feature granularity may include a coarse-grained type and a fine-grained type. For example, in the foregoing example of dividing the feature granularity into one coarse-grained type and L fine-grained types, it may be considered that the feature granularity specifically includes a feature granularity of one coarse-grained type and feature granularities of L fine-grained types.

Loss aggregation processing refers to a processing method for performing data aggregation on the related retrieval semantic loss. Specifically, a manner of performing data aggregation may include calculating an average value, summing, taking a maximum value, and the like.

For example, according to a granularity type of the feature granularity, loss aggregation processing may be performed on the retrieval semantic loss corresponding to each feature granularity, to obtain an aggregated retrieval semantic loss corresponding to each granularity type. As an example, an example in which the feature granularity specifically includes feature granularities of L fine-grained types, namely, L fine granularities may be used. Then loss aggregation processing may be performed on retrieval semantic losses corresponding to L fine granularities, such as calculating an average value:

$$\frac{1}{L}\sum_{l=1}^{L}L_{Fine(l)}$$

of the retrieval semantic losses corresponding to the L fine granularities, thereby obtaining an aggregated retrieval semantic loss corresponding to the fine-grained type.

Further, a final retrieval semantic loss required to perform model training on the content retrieval model may be determined based on the aggregated retrieval semantic loss corresponding to each granularity type, for example, may be calculated in a manner of summing, weighted calculation, and the like. As an example, in an example of dividing the feature granularity into 1 coarse granularity and L fine granularities, summation may be performed on the retrieval semantic loss $L_{Coarse}$ corresponding to the coarse-grained type and the retrieval semantic loss $$\frac{1}{L}\sum_{l=1}^{L}L_{Fine(l)}$$

corresponding to the fine-grained type, thereby obtaining a final retrieval semantic loss L required for model training, namely, $$L = L_{Coarse} + \frac{1}{L}\sum_{l=1}^{L} L_{Fine(l)}.$$

Model training is performed on the content retrieval model through the foregoing steps, and then a trained content retrieval model may be obtained. The trained content retrieval model may be integrated into a server or a terminal, so that retrieval result content corresponding to to-be-retrieved content may be retrieved through the trained content retrieval model. Specifically, the to-be-retrieved content may be obtained; feature extraction processing is performed on the to-be-retrieved content through a trained content retrieval model, to obtain a plurality of to-be-retrieved content features of different feature granularities; a similarity corresponding to the to-be-retrieved content and candidate retrieval result content at each feature granularity is calculated through the trained content retrieval model based on the to-be-retrieved content feature of each feature granularity; and based on the similarity corresponding to each feature granularity, retrieval result content corresponding to the to-be-retrieved content is determined through the trained content retrieval model. Specifically, for a process of the content retrieval, refer to introduction of the embodiments below.

It may be learnt from above, in embodiments of this application, the sample retrieval content and sample retrieval result content that matches the sample retrieval content may be obtained; through a content retrieval model, feature extraction processing is performed on the sample retrieval content and the sample retrieval result content, to obtain feature information of a plurality of different feature granularities, the feature information including a retrieval content feature and a retrieval result content feature; through the content retrieval model, feature quantification processing is performed on the retrieval content feature and the retrieval result content feature, to obtain quantified feature information of each feature granularity; based on the feature information and the quantified feature information, a retrieval semantic loss corresponding to each feature granularity is calculated; and model training is performed on the content retrieval model based on the retrieval semantic loss corresponding to each feature granularity.

The solution may combine feature learning of content and quantification learning of features, so that the feature quantification module is added to training of feature learning. In this way, a semantic loss of feature quantification may be added to an objective of model training optimization, so that semantic information of the sample retrieval content and the sample retrieval result content may be better retained in the quantified feature, to avoid a large semantic deviation between the quantified content feature of the sample retrieval content and the quantified content feature of the sample retrieval result content due to a quantification loss caused by feature quantization when feature learning and feature quantification are independently executed. In addition, in the solution, when there is a large difference between the retrieval content feature and the retrieval result content feature (for example, when the retrieval content feature and the retrieval result content feature correspond to different feature modes), by extracting feature information of a plurality of different feature granularities, feature alignment may be further subsequently performed according to a plurality of feature granularities, thereby reducing the modal differences between content features and achieving better content retrieval results.

In addition, in the solution, multi-modal information in the sample retrieval result content is fully exploited and utilized, and the model's capability to understand semantics of the sample retrieval result content is strengthened, to obtain a better-quality representation corresponding to the sample retrieval result content. In addition, in an application scenario in which the sample retrieval content and the sample retrieval result content correspond to different content modes, such as an application scenario of retrieving the video content based on the text content, the solution may significantly reduce a modal difference between a sample retrieval content side and a sample retrieval result content side through cross-modal alignment of multi-feature granularities, thereby achieving a better cross-modal retrieval result.

More specifically, in the application scenario of retrieving the video based on the text, this application may effectively optimize an index representation of the text and the video, improve video retrieval precision, and optimize user experience by providing an end-to-end optimized text video vectorization retrieval method, using a Transformer model to model video multi-modal information, and designing a fine-grained cross-modal representation alignment solution.

According to the method described in the foregoing embodiment, the following further provides detailed description by using an example.

In this embodiment, an example in which the model training apparatus is integrated into the server and the terminal is used for description. The server may be a single server or a server cluster including a plurality of servers. The terminal may be a device such as a mobile phone, a tablet computer, and a notebook computer.

As shown in FIG. 4, a specific process of a model training method is as follows:

201: A server obtains sample retrieval content and sample retrieval result content that matches the sample retrieval content.

In this application, the sample retrieval content and sample retrieval result content may correspond to different content modes. The content retrieval model may be trained, so that a trained content retrieval model may implement cross-modal retrieval, for example, retrieving a picture based on a text, retrieving a web page based on a text, retrieving a video based on a text, and the like.

The sample retrieval result content may specifically include text content, image content, video content, audio content, link content, and the like; and for another example, the sample retrieval result content may be obtained by combining a plurality of types of content, such as page content, advertising content, and the like. Similarly, the sample retrieval content may specifically include text content, image content, video content, audio content, link content, and the like; and for another example, the sample retrieval content may be obtained by combining a plurality of types of content, such as page content, advertising content, and the like.

Figure 5:
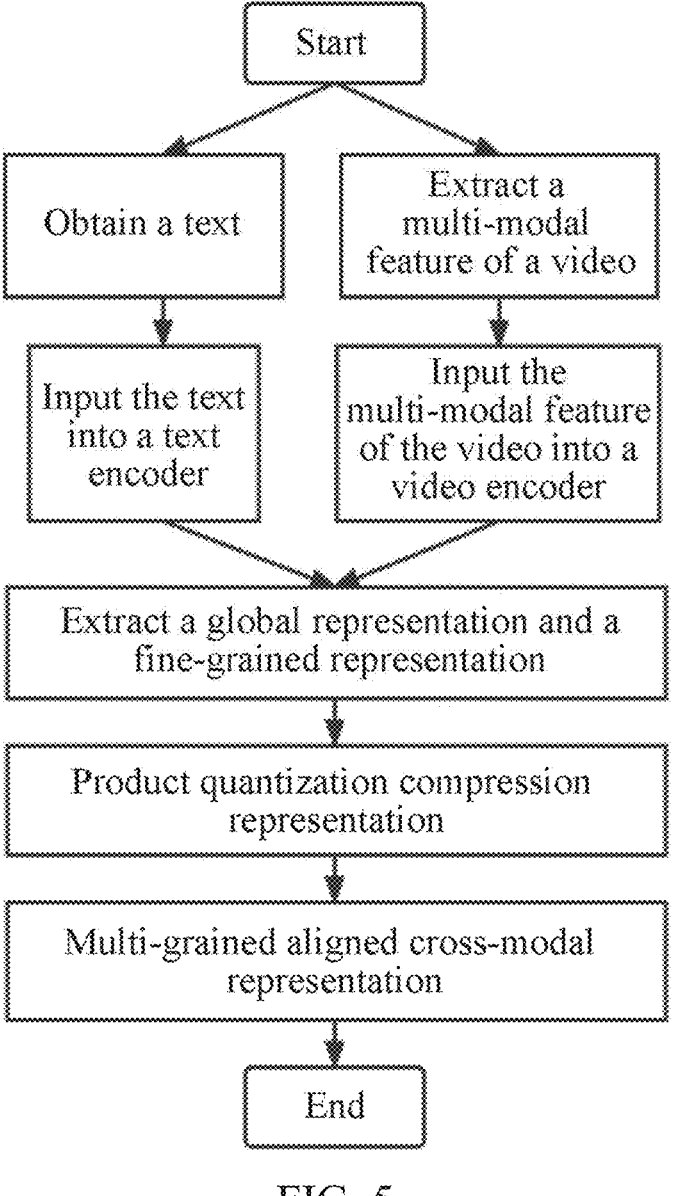
FIG. 5 is another schematic flowchart of a model training method according to an embodiment of this application.

For example, referring to FIG. 5, the sample retrieval content may be specifically the text content, and the sample retrieval result content may be specifically the video content. The server may obtain to-be-processed sample text data and sample video data to form a training sample pair. In other words, each training sample pair may include a query text and a video that matches the query text.

202: The server performs, through a content retrieval model, feature extraction processing on the sample retrieval content and the sample retrieval result content, to obtain feature information of a plurality of different feature granularities, where the feature information includes a retrieval content feature and a retrieval result content feature.

In an application scenario of retrieving the video based on the text, referring to FIG. 5, a global representation and a fine-grained representation of the text may be extracted by inputting the text into a text encoder. The global representation of the text refers to a coarse-grained retrieval content feature of the text, and the fine-grained representation of the text refers to a fine-grained retrieval content feature of the text. In addition, a multi-modal feature of the video may be input into a video encoder, to extract a global representation and a fine-grained representation of the video. The global representation of the video refers to a coarse-grained retrieval result content feature of the video, and the fine-grained representation of the video refers to a fine-grained retrieval result content feature of the video. An implementation of the text encoder and the video encoder is not limited in this application. For example, in addition to a Transformer mechanism, models that may learn segment/sentence sequences such as a long short-term memory artificial neural network LSTM (LSTM), a convolutional LSTM (ConvLSTM), and the like may be further applied.

For example, in the example of retrieving the video based on the text, a schematic diagram of a model architecture of the content retrieval model may be shown in FIG. 3. By performing preprocessing on the video, features of 30 frames of image that are evenly sampled, a speech feature, and a text feature transcribed by OCR and ASR may be obtained as input into the video multi-modal Transformer. Further, the text may be input into a text Transformer encoder for processing, and the video multi-modal feature may be input into the video Transformer for processing. Then the global representation of the text and the global representation of the video may be separately obtained from the text encoder and the video encoder, and the fine-grained representation of the text and the fine-grained representation of the video may be obtained through a fine-grained representation extraction module shared by the text side and the video side.

203: The server performs, through the content retrieval model, feature quantification processing on the retrieval content feature and the retrieval result content feature, to obtain quantified feature information of each feature granularity.

For example, referring to FIG. 5, a product quantization module may be configured to compress the retrieval content feature and the retrieval result content feature that are obtained in step 202.

204: The server calculates, based on the feature information and the quantified feature information, a retrieval semantic loss corresponding to each feature granularity.

For example, referring to FIG. 5, cross-modal representations may be aligned by applying contrastive learning on representations of a plurality of feature granularities, and the retrieval semantic loss corresponding to each feature granularity may be calculated based on the contrastive learning mechanism.

A cross-modal alignment manner is not limited in this application. For example, in addition to using contrastive learning, a metric learning mechanism may also be selected. For example, the contrastive learning loss may be changed to a triplet loss.

205: The server performs model training on the content retrieval model based on the retrieval semantic loss corresponding to each feature granularity, to obtain a trained content retrieval model.

For example, according to a granularity type of the feature granularity, loss aggregation processing may be performed on the retrieval semantic loss corresponding to each feature granularity, to obtain an aggregated retrieval semantic loss corresponding to each granularity type. Further, a final retrieval semantic loss of model training may be determined based on the aggregated retrieval semantic loss corresponding to each granularity type, and based on the final retrieval semantic loss and the BP algorithm, the content retrieval model is trained, to obtain a trained content retrieval model.

Step 206. A terminal sends to-be-retrieved content to the server.

Figure 6:
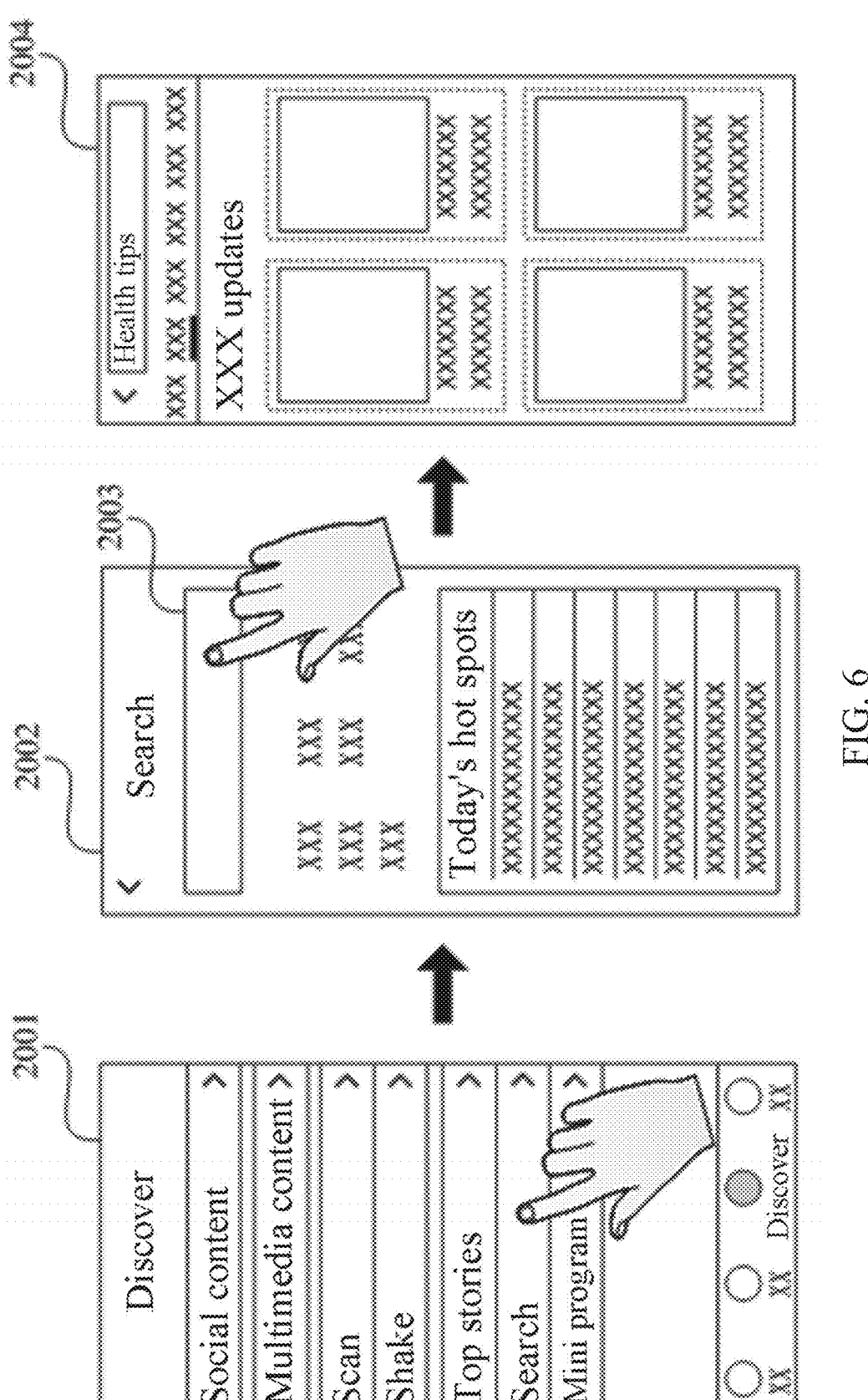
FIG. 6 is a schematic diagram of another scenario of a model training method according to an embodiment of this application.
Figures 10, 11, 12:
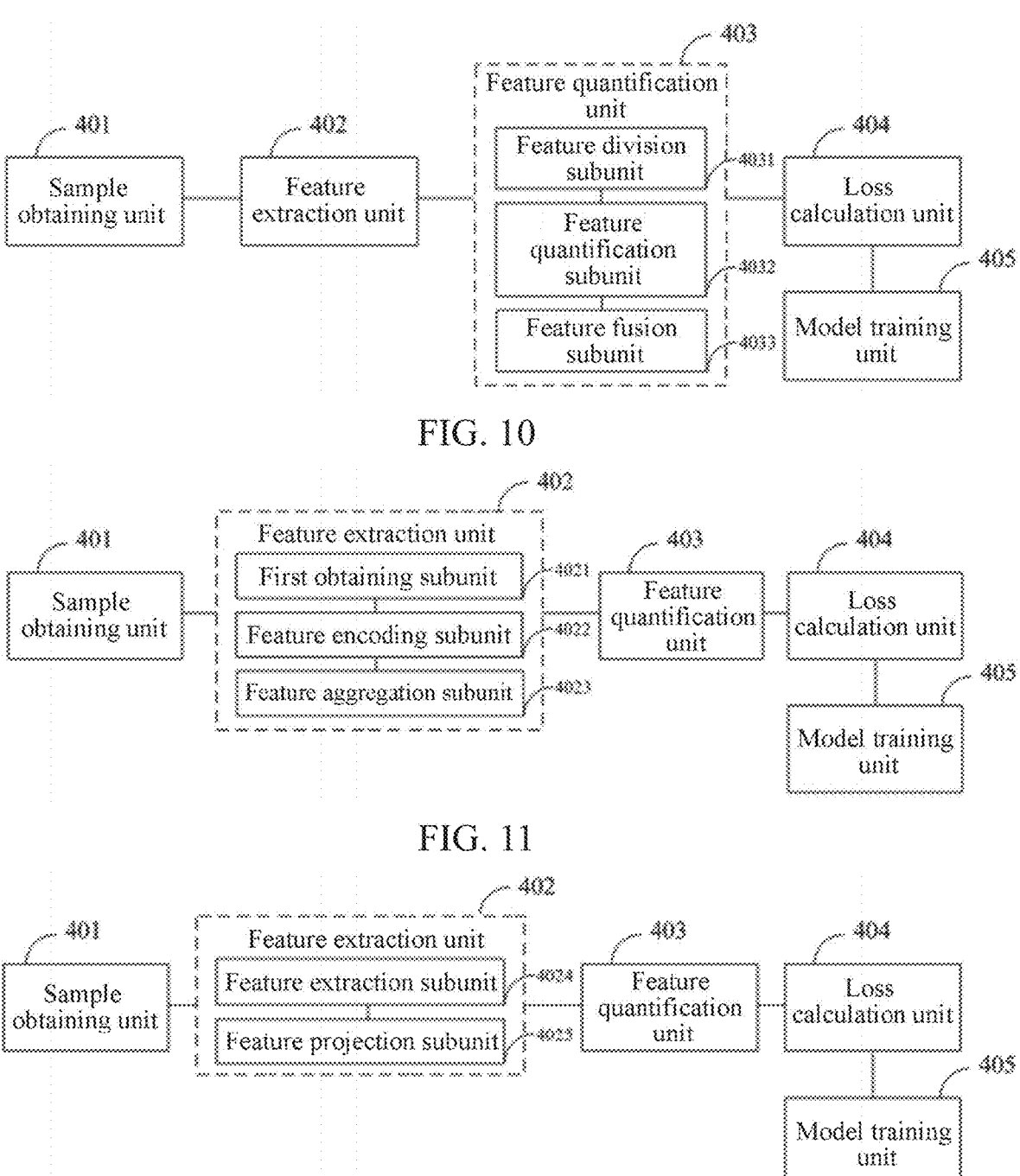
FIG. 10 is a schematic diagram of another structure of a model training apparatus according to an embodiment of this application.
FIG. 11 is a schematic diagram of another structure of a model training apparatus according to an embodiment of this application.
FIG. 12 is a schematic diagram of another structure of a model training apparatus according to an embodiment of this application.

For example, referring to FIG. 6, in an application scenario of retrieving a video based on a text, the terminal may display, in response to a content retrieval operation triggered by a user based on a content discovery page 2001, a content retrieval page 2002, and obtain, through a content retrieval control 2003 on the content retrieval page 2002, a to-be-retrieved text ("Health tips" in FIG. 6) input by the user, namely, the to-be-retrieved content.

207: The server determines retrieval result content that matches the to-be-retrieved content through the trained content retrieval model.

For example, the server may determine a video that matches the to-be-retrieved text "Health tips" through the trained content retrieval model, that is, the retrieval result content that matches the to-be-retrieved content.

208. The terminal determines a retrieval result of the to-be-retrieved content based on the retrieval result content that matches the to-be-retrieved content.

The terminal may determine the retrieval result content that matches the to-be-retrieved content through the server, and determine the retrieval result of the to-be-retrieved content based on the retrieval result content. For example, after determining, through the server, the video that matches "Healthy tips", the terminal may display the retrieved video on a retrieval result display page 2004.

It may be learnt from the above that embodiments of this application may combine feature learning of content and quantification learning of features, so that the feature quantification module is added to training of feature learning. In this way, a semantic loss of feature quantification may be added to a goal of model training optimization, so that semantic information of the sample retrieval content and the sample retrieval result content may be better retained in the quantified feature, to avoid a large semantic deviation between the quantified content feature of the sample retrieval content and the quantified content feature of the sample retrieval result content due to a quantification loss caused by feature quantization when feature learning and feature quantification are independently executed. In the solution, when there is a large difference between the retrieval content feature and the retrieval result content feature (for example, when the retrieval content feature and the retrieval result content feature correspond to different feature modes), by extracting feature information of a plurality of different feature granularities, feature alignment may be further subsequently performed according to a plurality of feature granularities, thereby reducing the modal differences between content features and achieving better content retrieval results.

In the application scenario of retrieving the video based on the text, this application combines representation learning and representation compression into a single-stage method, to directly optimize the representation after the product is quantified. By adding the product quantification module to training of the representation model, and adding a semantic loss of the product quantification to an optimized target, the semantic information of the text and the video may be better retained in the representation after the product is quantified. In addition, the solution may mine and use multi-modal information in the video, and learn a multi-modal representation of the video. In addition to using a picture feature of a single frame, the solution further extracts audio information in the video, and uses text information transcribed by ASR and OCR as input into the video encoder. In addition, in addition to global and coarse-grained cross-modal alignment, the solution further proposes cross-modal alignment on fine-grained semantics. Specifically, in addition to extracting global representations of the text and the video, the solution further extracts fine-grained semantic representation sequences of the text and the video. Through fine-grained representation alignment, the solution may greatly reduce a modal difference between the text side and the video side, thereby achieving a better cross-modal retrieval effect.

According to the method described in the foregoing embodiment, the following further provides detailed description by using an example.

This embodiment is described from the perspective of a content retrieval apparatus. The content retrieval apparatus may be specifically integrated in a server or a terminal.

Embodiments of this application provide a content retrieval method. The method may be performed by a terminal or a server, or jointly performed by a terminal and a server; and in embodiments of this application, an example in which the content retrieval method is performed by the server is used for description. Specifically, the content retrieval method is performed by the content retrieval apparatus integrated in the server. As shown in FIG. 7, a specific process of the content retrieval method may be as follows:

301: Obtain to-be-retrieved content.

A content mode corresponding to the to-be-retrieved content may be in a plurality of cases, for example, may include a text, an image, a video, a web page, and an audio.

The server may obtain the to-be-retrieved content in a plurality of manners. For example, the terminal may send the to-be-retrieved content to the server. For example, in an application scenario of retrieving a video based on a text shown in FIG. 6, the terminal may send a target retrieval text input by a user to the server, and the target retrieval text is the to-be-retrieved content.

302: Perform feature extraction processing on the to-be-retrieved content through a content retrieval model, to obtain a plurality of to-be-retrieved content features of different feature granularities.

The content retrieval model (namely, the trained content retrieval model in the above) may be obtained by training through the model training method in this application. For details, refer to the description in the foregoing embodiments. This is not repeated herein. For example, the content retrieval model may be integrated in the server, to provide a content retrieval service to the terminal; and for another example, the content retrieval model may be integrated in the terminal, so that the terminal directly provides the content retrieval service.

The to-be-retrieved content feature is a feature obtained by performing feature extraction processing on the to-be-retrieved content. Feature extraction processing may be performed on the to-be-retrieved content through the content retrieval model, and retrieval content features of a plurality of different feature granularities of the to-be-retrieved content may be obtained.

As an example, the feature granularity may include a coarse granularity, and the content retrieval model may include a second coarse-grained feature extraction module. The second coarse-grained feature extraction module may be specifically configured to extract the coarse-grained retrieval content feature of the sample retrieval content during model training; and during content retrieval, the second coarse-grained feature extraction module may be specifically configured to extract a coarse-grained to-be-retrieved content feature from the to-be-retrieved content. Specifically, a semantic representation feature of the to-be-retrieved content may be extracted through the second coarse-grained feature extraction module; and feature projection processing is performed on the semantic representation feature based on a self-attention mechanism, to obtain a coarse-grained to-be-retrieved content feature of the to-be-retrieved content.

As an example, the feature granularity may include a fine granularity, and the content retrieval model may include a fine-grained feature extraction module. The fine-grained feature extraction module is shared by the sample retrieval content and the sample retrieval result content during model training. In addition, the fine-grained extraction module may be specifically configured to extract a plurality of different fine-grained retrieval content features during model training, and a plurality of different fine-grained retrieval result content features; and during content retrieval, the fine-grained feature extraction module may be specifically configured to extract a plurality of different fine-grained to-be-retrieved content features of the to-be-retrieved content. Specifically, a plurality of to-be-clustered content features of the to-be-retrieved content may be obtained; feature clustering processing is performed on the to-be-clustered content features through the fine-grained feature extraction module; and based on a clustering result, a plurality of different fine-grained to-be-retrieved content features of the to-be-retrieved content are determined.

As an example, when obtaining the plurality of to-be-clustered content features of the to-be-retrieved content, content division processing may be specifically performed on the to-be-retrieved content, to obtain at least one piece of sub-content of the to-be-retrieved content; a sub-content feature corresponding to the sub-content is extracted; and the plurality of to-be-clustered content features of the to-be-retrieved content are determined according to the sub-content feature.

303: Calculate, based on the to-be-retrieved content feature of each feature granularity, a similarity corresponding to the to-be-retrieved content and candidate retrieval result content at each feature granularity.

The candidate retrieval result content refers to retrieval result content that may match the to-be-retrieved content. Specifically, the retrieval result content that matches the to-be-retrieved content may be determined from the candidate retrieval result content by calculating a similarity between the to-be-retrieved content and the candidate retrieval result content at each feature granularity.

In an embodiment, a similarity corresponding to the to-be-retrieved content and the candidate retrieval result content at each feature granularity may be calculated by calculating the similarity between the to-be-retrieved content feature of each feature granularity and the quantified retrieval result content feature. Specifically, the step "calculating, based on the to-be-retrieved content feature of each feature granularity, a similarity corresponding to the to-be-retrieved content and candidate retrieval result content at each feature granularity" may include:

determining a quantified retrieval result content feature corresponding to each feature granularity of the candidate retrieval result content; and calculating a similarity between the to-be-retrieved content feature and the quantified retrieval result content feature according to the feature granularity, to obtain the similarity corresponding to each feature granularity.

For example, the quantified retrieval result content features corresponding to a plurality of different feature granularities of the candidate retrieval result content may be calculated through the content retrieval model. For example, feature extraction processing may be performed on the candidate retrieval result content through the content retrieval model, to obtain retrieval result content features of the plurality of different feature granularities of the candidate retrieval result content; and through the content retrieval model, feature quantification processing is performed on the retrieval result content features, to obtain the quantified retrieval result content feature of each feature granularity of the candidate retrieval result content.

As an example, the feature granularity may include a coarse granularity, and the content retrieval model may include a first coarse-grained feature extraction module. The first coarse-grained feature extraction module may be specifically configured to extract a coarse-grained retrieval result content feature of the sample retrieval result content during model training; and during content retrieval, the first coarse-grained feature extraction module may be specifically configured to extract a coarse-grained retrieval result content feature of the candidate retrieval result content. Specifically, a modal content feature corresponding to at least one content mode of the candidate retrieval result content may be obtained; through the first coarse-grained feature extraction module, feature encoding processing is performed on the modal content feature based on a self-attention mechanism, to obtain an encoded feature corresponding to each content mode; and feature aggregation processing is performed on the encoded feature corresponding to each content mode, to obtain a coarse-grained retrieval result content feature of the candidate retrieval result content.

As an example, the feature granularity may include a fine granularity, and the content retrieval model may include a fine-grained feature extraction module. The fine-grained feature extraction module is shared by the sample retrieval content and the sample retrieval result content during model training. In addition, the fine-grained extraction module may be specifically configured to extract a plurality of different fine-grained retrieval content features during model training, and a plurality of different fine-grained retrieval result content features; and during content retrieval, the fine-grained feature extraction module may be specifically configured to extract a plurality of different fine-grained retrieval result content features of the candidate retrieval result content. Specifically, a plurality of to-be-clustered content features of the candidate retrieval result content may be obtained; feature clustering processing is performed on the to-be-clustered content features through the fine-grained feature extraction module; and based on the clustering result, a plurality of different fine-grained retrieval result content features of the candidate retrieval result content are determined.

As an example, when obtaining the plurality of to-be-clustered content features of the candidate retrieval result content, at least one content mode of the candidate retrieval result content may be specifically determined; the candidate retrieval result content and the modal content feature corresponding to the content mode are extracted; and the plurality of to-be-clustered content features of the candidate retrieval result content are determined according to the modal content feature.

As an example, the content retrieval model may include a feature quantification model corresponding to each feature granularity, and each feature quantification model may be configured to perform feature quantification processing on the retrieval result content feature of the corresponding feature granularity of the candidate retrieval result content. Specifically, feature division processing may be performed on the retrieval result content feature of the corresponding feature granularity of the candidate retrieval result content through the feature quantification module, to obtain the divided sub-retrieval result content feature; feature quantification processing is performed on the divided sub-retrieval result content feature, to obtain a quantified sub-retrieval result content feature; and feature fusion processing is performed on the quantified sub-retrieval result content feature, to obtain quantified retrieval result content feature of each feature granularity of the candidate retrieval result content.

Further, feature alignment may be performed on the to-be-retrieved content feature and the quantified retrieval result content feature through the feature granularity, and a similarity corresponding to each feature granularity may be obtained by calculating a similarity, for example, a cosine similarity, between the aligned to-be-retrieved content feature and the quantified retrieval result content feature.

304: Determine, based on the similarity corresponding to each feature granularity, retrieval result content corresponding to the to-be-retrieved content.

As an example, data aggregation processing may be performed on the similarity corresponding to each feature granularity according to a granularity type of the feature granularity; and based on the aggregated similarity, the retrieval result content corresponding to the to-be-retrieved content is determined from the candidate retrieval result content. For example, according to the aggregated similarity of each candidate retrieval result content, the candidate retrieval result content corresponding to the maximum aggregated similarity may be determined as the retrieval result content corresponding to the to-be-retrieved content.

For a specific implementation and corresponding beneficial effects in this embodiment, refer to the foregoing model training method embodiments. This is not repeated in this embodiment herein.

It may be learnt from the above that the content retrieval method provided in embodiments of this application may accurately implement content retrieval through the content retrieval model. For example, when the to-be-retrieved content and the retrieval result content correspond to different content modes, highly accurate cross-modal content retrieval may be implemented in embodiments of this application.

To better implement the foregoing method, correspondingly, embodiments of this application further provide a model training apparatus, where the model training apparatus may be integrated in a server or a terminal. The server may be a single server or a server cluster including a plurality of servers. The terminal may be a device such as a mobile phone, a tablet computer, and a notebook computer.

For example, as shown in FIG. 8, the model training apparatus may include a sample obtaining unit 401, a feature extraction unit 402, a feature quantification unit 403, a loss calculation unit 404, and a model training unit 405, as follows:

the sample obtaining unit 401 may be configured to obtain sample retrieval content and sample retrieval result content that matches the sample retrieval content;

the feature extraction unit 402 may be configured to perform, through a content retrieval model, feature extraction processing on the sample retrieval content and the sample retrieval result content, to obtain feature information with a plurality of different feature granularities, the feature information including a retrieval content feature and a retrieval result content feature;

the feature quantification unit 403 may be configured to perform, through the content retrieval model, feature quantification processing on the retrieval content feature and the retrieval result content feature, to obtain quantified feature information of each feature granularity;

the loss calculation unit 404 may be configured to calculate, based on the feature information and the quantified feature information, a retrieval semantic loss corresponding to each feature granularity; and the model training unit 405 may be configured to perform model training on the content retrieval model based on the retrieval semantic loss corresponding to each feature granularity.

In an embodiment, referring to FIG. 9, the loss calculation unit 404 may include:

a bidirectional calculation subunit 4041, configured to calculate, based on the feature information and the quantified feature information, a first retrieval semantic loss of each feature granularity in a first semantic retrieval direction, and a second retrieval semantic loss of each feature granularity in a second semantic retrieval direction;

a loss aggregation subunit 4042, configured to perform loss aggregation processing on the first retrieval semantic loss and the second retrieval semantic loss; and a loss determining subunit 4043, configured to determine, according to a processing result of the loss aggregation processing, the retrieval semantic loss corresponding to each feature granularity.

In an embodiment, the bidirectional calculation subunit 4041 may be configured to:

according to the first semantic retrieval direction, determine a target feature from the feature information, and determine a target quantified feature from the quantified feature information, where the target feature and the target quantified feature correspond to different feature modes; perform feature alignment processing on the target feature and the target quantified feature according to the feature granularity; and calculate the first retrieval semantic loss corresponding to each feature granularity in the first semantic retrieval direction based on a feature similarity between an aligned target feature and an aligned target quantified feature.

In an embodiment, referring to 10, the content retrieval model includes a feature quantification module corresponding to each feature granularity, and each feature quantification module is configured to perform feature quantification processing on feature information of the feature granularity corresponding to each feature quantification module; and the feature quantification unit 403 may include:

a feature dividing subunit 4031, configured to perform, for each feature granularity and through the feature quantification module corresponding to the feature granularity, feature division processing on a retrieval content feature corresponding to the feature granularity, to obtain a divided sub-retrieval content feature corresponding to the feature granularity;

a feature quantification subunit 4032, configured to separately perform feature quantification processing on the divided sub-retrieval content feature corresponding to the feature granularity, to obtain a quantified sub-retrieval content feature corresponding to the feature granularity; and a feature fusion subunit 4033, configured to perform feature fusion processing on the quantified sub-retrieval content feature corresponding to the feature granularity, to obtain a quantified retrieval content feature of the feature granularity.

In an embodiment, referring to 11, the feature granularity includes a coarse granularity, and the content retrieval model includes a first coarse-grained feature extraction module for the sample retrieval result content; and the feature extraction unit 402 may include:

a first obtaining subunit 4021, configured to obtain a modal content feature corresponding to at least one content mode of the sample retrieval result content;

a feature encoding subunit 4022, configured to separately perform, through the first coarse-grained feature extraction module, feature encoding processing on the modal content feature based on a self-attention mechanism, to obtain an encoded feature corresponding to each content mode; and a feature aggregation subunit 4023, configured to perform feature aggregation processing on the encoded feature corresponding to each content mode, to obtain a coarse-grained retrieval result content feature of the sample retrieval result content.

In an embodiment, referring to 12, the feature granularity includes a coarse granularity, and the content retrieval model includes a second coarse-grained feature extraction module for the sample retrieval content; and the feature extraction unit 402 may include:

a feature extraction subunit 4024, configured to extract a semantic representation feature of the sample retrieval content through the second coarse-grained feature extraction module; and a feature projection subunit 4025, configured to perform feature projection processing on the semantic representation feature based on a self-attention mechanism, to obtain a coarse-grained retrieval content feature of the sample retrieval content.

In an embodiment, referring to 13, the feature granularity includes a fine granularity, and the content retrieval model includes a fine-grained feature extraction module shared by the sample retrieval content and the sample retrieval result content; and the feature extraction unit 402 may include:

a second obtaining subunit 4026, configured to obtain a plurality of to-be-clustered content features of the sample retrieval content and the sample retrieval result content;

a feature clustering subunit 4027, configured to perform feature clustering processing on the to-be-clustered content features through the fine-grained feature extraction module; and an information determining subunit 4028, configured to determine feature information of a plurality of different fine granularities based on a clustering result of the feature clustering processing, where the feature information includes the retrieval content feature and the retrieval result content feature.

In an embodiment, the second obtaining unit 4026 may be configured to:

determine at least one content mode of the sample retrieval result content; extract the sample retrieval result content and the modal content feature corresponding to the content mode; and determine the plurality of to-be-clustered content features of the sample retrieval result content according to the modal content feature.

In an embodiment, the second obtaining unit 4026 may be configured to:

perform content division processing on the sample retrieval content, to obtain at least one piece of subcontent of the sample retrieval content; extract a subcontent feature corresponding to the sub-content; and determine the plurality of to-be-clustered content features of the sample retrieval content according to the sub-content feature.

Figures 13, 14, 15, 16:
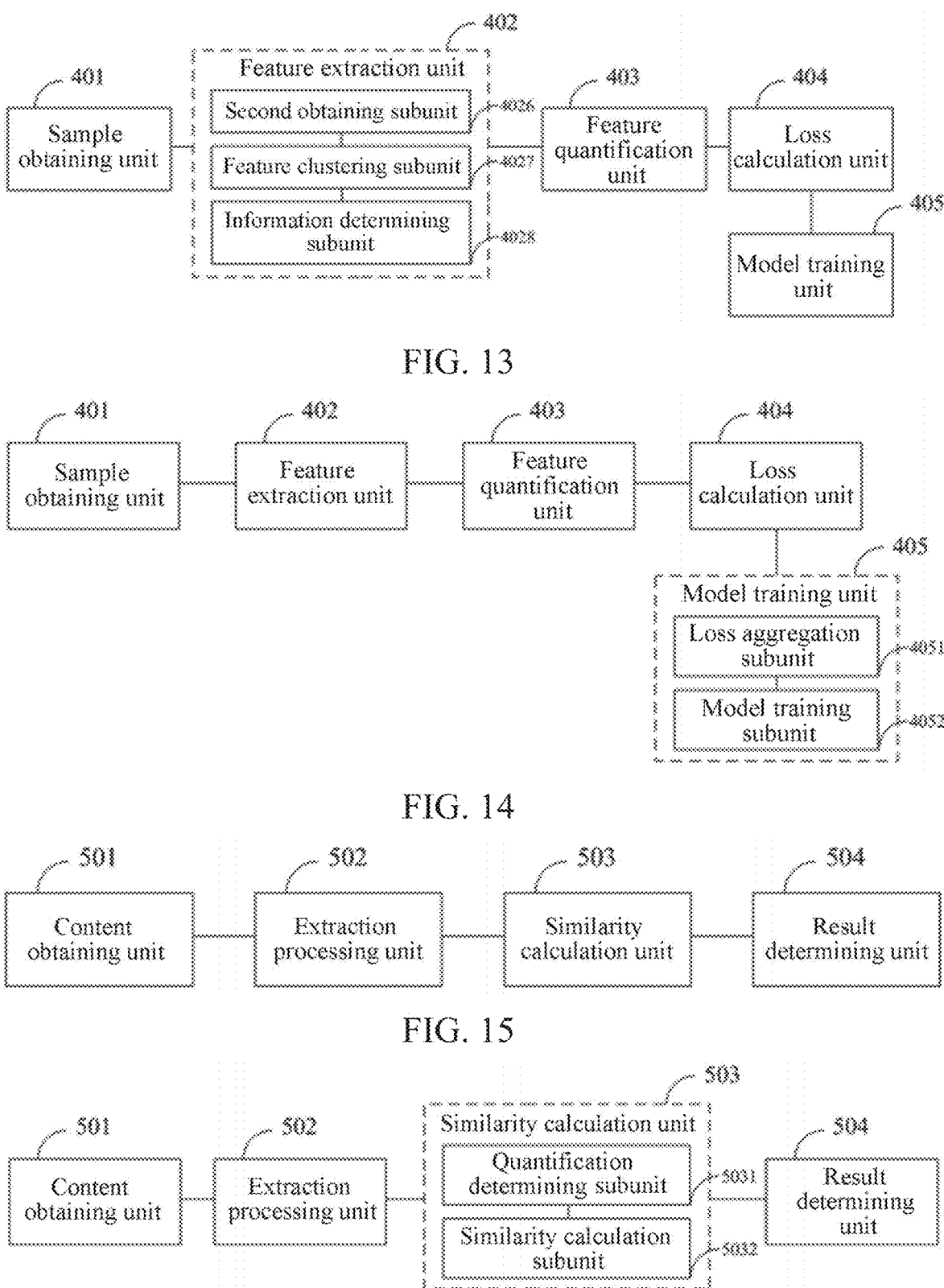
FIG. 13 is a schematic diagram of another structure of a model training apparatus according to an embodiment of this application.
FIG. 14 is a schematic diagram of another structure of a model training apparatus according to an embodiment of this application.
FIG. 15 is a schematic diagram of a structure of a content detection apparatus according to an embodiment of this application.
FIG. 16 is a schematic diagram of another structure of a content detection apparatus according to an embodiment of this application.

In an embodiment, referring to FIG. 14, the model training unit 405 may include:

a loss aggregation subunit 4051, configured to perform, according to a granularity type of the feature granularity, loss aggregation processing on the retrieval semantic loss corresponding to each feature granularity; and a model training subunit 4052, configured to perform model training on the content retrieval model based on an aggregated retrieval semantic loss.

During specific implementation, the foregoing units may be implemented as independent entities, or may be combined arbitrarily and implemented as the same entity or a plurality of entities. For specific implementation of the foregoing units, refer to the foregoing method embodiments, so the details are not described herein again.

It may be learnt from the above that in the model training apparatus of this embodiment, the sample obtaining unit 401 obtains the sample retrieval content and the sample retrieval result content that matches the sample retrieval content; the feature extraction unit 402 performs, through a content retrieval model, feature extraction processing on the sample retrieval content and the sample retrieval result content, to obtain feature information with a plurality of different feature granularities, the feature information including a retrieval content feature and a retrieval result content feature; the feature quantification unit 403 performs, through the content retrieval model, feature quantification processing on the retrieval content feature and the retrieval result content feature, to obtain quantified feature information of each feature granularity; the loss calculation unit 404 calculates, based on the feature information and the quantified feature information, a retrieval semantic loss corresponding to each feature granularity; and the model training unit 405 performs model training on the content retrieval model based on the retrieval semantic loss corresponding to each feature granularity.

The solution may combine feature learning of content and quantification learning of features, so that the feature quantification module is added to training of feature learning. In this way, a semantic loss of feature quantification may be added to an objective of model training optimization, so that semantic information of the sample retrieval content and the sample retrieval result content may be better retained in the quantified feature, to avoid a large semantic deviation between the quantified content feature of the sample retrieval content and the quantified content feature of the sample retrieval result content due to a quantification loss caused by feature quantization when feature learning and feature quantification are independently executed. In addition, in the solution, when there is a large difference between the retrieval content feature and the retrieval result content feature (for example, when the retrieval content feature and the retrieval result content feature correspond to different feature modes), by extracting feature information of a plurality of different feature granularities, feature alignment may be further subsequently performed according to a plurality of feature granularities, thereby reducing the modal differences between content features and achieving better content retrieval results.

To better implement the foregoing method, correspondingly, embodiments of the present disclosure further provide a content retrieval apparatus, where the content retrieval apparatus may be integrated in a server or a terminal.

For example, as shown in FIG. 15, the content retrieval apparatus may include a content obtaining unit 501, an extraction processing unit 502, a similarity calculation unit 503, and a result determining unit 504, as follows:

the content obtaining unit 501 may be configured to obtain to-be-retrieved content;

the extraction processing unit 502 may be configured to perform feature extraction processing on the to-be-retrieved content through a content retrieval model, to obtain a plurality of to-be-retrieved content features of different feature granularities;

the similarity calculation unit 503 may be configured to calculate, based on the to-be-retrieved content feature of each feature granularity, a similarity corresponding to the to-be-retrieved content and candidate retrieval result content at each feature granularity; and the result determining unit 504 may be configured to determine, based on the similarity corresponding to each feature granularity, retrieval result content corresponding to the to-be-retrieved content.

In an embodiment, referring to FIG. 16, the similarity calculation unit 503 may include:

a quantification determining subunit 5031, configured to determine a quantified retrieval result content feature corresponding to each feature granularity of the candidate retrieval result content; and a similarity calculation subunit 5032, configured to calculate a similarity between the to-be-retrieved content feature and the quantified retrieval result content feature according to the feature granularity, to obtain the similarity corresponding to each feature granularity.

The content retrieval apparatus provided in embodiments of this application may accurately implement content retrieval through the content retrieval model. For example, when the to-be-retrieved content and the retrieval result content correspond to different content modes, cross-modal content retrieval with high precision may be implemented in embodiments of this application.

Figure 17:
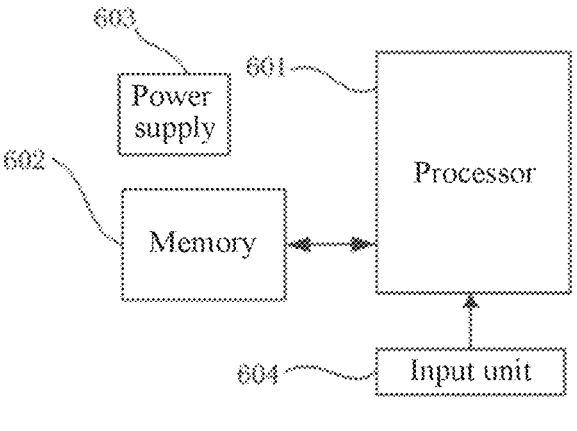
FIG. 17 is a schematic diagram of a structure of a computer device according to an embodiment of this application.

In addition, embodiments of this application further provide a computer device. The computer device may be a device such as a server, a terminal, or the like. FIG. 17 is a schematic diagram of a structure of a computer device according to an embodiment of this application. Specifically, the computer device may include components such as a processor 601 including one or more processing cores, a memory 602 including one or more computer-readable storage media, a power supply 603, and an input unit 604. A person skilled in the art may understand that, the structure of the computer device shown in FIG. 17 does not constitute a limitation to the computer device. The computer device may include components that are more or fewer than those shown in the figure, or some components may be combined, or a different component deployment may be used.

The processor 601 is a control center of the computer device, and is connected to various parts of the entire computer device by using various interfaces and lines. By running or executing software programs and/or modules stored in the memory 602, and invoking data stored in the memory 602, the processor performs various functions and data processing of the computer device. In some embodiments, the processor 601 may include one or more processing cores. Preferably, the processor 601 may integrate an application processor and a modem. The application processor mainly processes an operating system, a user page, an application program, and the like. The modem mainly processes wireless communication. It may be understood that the foregoing modem may be integrated into the processor 601 or not.

The memory 602 may be configured to store a software program and a module, and the processor 601 runs the software program and the module that are stored in the memory 602, to implement various functional applications and data processing. The memory 602 may mainly include a program storage area and a data storage area. The program storage area may store an operating system, an application program required by at least one function (for example, a sound playback function and an image display function), and the like. The data storage area may store data created according to use of the computer device. In addition, the memory 602 may include a high speed random access memory, and may further include a non-volatile memory, such as at least one magnetic disk storage device, a flash memory, or another volatile solid storage device. Correspondingly, the memory 602 may further include a memory controller, to provide access of the processor 601 to the memory 602.

The computer device may further include the power supply 603 for supplying power to the components. Preferably, the power supply 603 may be logically connected to the processor 601 by using a power management system, thereby implementing functions such as charging, discharging, and power consumption management by using the power management system. The power supply 603 may further include one or more direct current or alternating current power supplies, a re-charging system, a power failure detection circuit, a power supply converter or inverter, a power supply state indicator, and any other component.

The computer device may further include the input unit 604. The input unit 604 may be configured to receive input digit or character information and generate keyboard, mouse, joystick, optical, or trackball signal input related to user settings and function control.

Although not shown in the figure, the computer device may further include a display unit, and the like. Details are not described herein again. Specifically, in this embodiment, the processor 601 in the computer device may load executable files corresponding to processes of one or more applications to the memory 602 according to the following instructions, and the processor 601 runs the applications stored in the memory 602, to implement the model training method or the content retrieval method provided in embodiments of this application.

A person of ordinary skill in the art may understand that, all or some steps of the methods in the foregoing embodiments may be implemented by using instructions, or implemented through instructions controlling relevant hardware, and the instructions may be stored in a non-transitory computer-readable storage medium and loaded and executed by a processor.

Accordingly, embodiments of this application provide a non-transitory computer-readable storage medium, storing a plurality of instructions, the instructions being capable of being loaded by a processor, to perform steps in any model training method or content retrieval method according to embodiments of this application.

The storage medium may include: a read-only memory (ROM), a random access memory (RAM), a magnetic disk, an optical disc, or the like.

Because the instructions stored in the storage medium may perform the steps of any model training method or content retrieval method provided in embodiments of this application, the instructions may implement beneficial effects that may be implemented by any model training method or content retrieval method provided in embodiments of this application. For details, refer to the foregoing embodiments. Details are not described herein again.

According to an aspect of this application, a computer program product or a computer program is provided, the computer program product or the computer program including computer instructions, the computer instructions being stored in a computer-readable storage medium. A processor of a computer device reads the computer instruction from the computer-readable storage medium and executes the computer instruction, to cause the computer device to perform the method provided in the foregoing various implementations of the model training method or the content retrieval method.

A model training method and apparatus, a computer device, and a storage medium that are provided in embodiments of this application are described in detail above. The principle and implementations of this application are described in this specification by using specific examples. In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules or units. Moreover, each module can be part of an overall module that includes the functionalities of the module or unit. The descriptions of the foregoing embodiments are merely used for helping understand the method and core ideas of this application. Meanwhile, a person of skill in the art may make modifications to the specific implementations and application scopes according to the ideas of this application. In conclusion, the content of the specification should not be construed as a limitation to this application.

What is claimed is:

1. A video content retrieval method performed by a computer device, the method comprising:

obtaining a query text from a user, wherein the query text is associated with a plurality of candidate videos;

performing feature extraction processing on the query text through a text encoder in a video content retrieval model, to obtain a plurality of text content features at different feature granularities, wherein the plurality of text content features at the different feature granularities include a first text content feature at a coarse granularity and a second text content feature at a fine granularity;

transcribing the plurality of candidate video based on optical character recognition (OCR) and automatic speech recognition (ASR) technology to obtain a plurality of speech features and text features from the plurality of candidate videos;

performing multi-modal feature extraction processing on the plurality of candidate videos and their corresponding plurality of speech features and text features through a video encoder in the video content retrieval model, to obtain a plurality of multi-modal video content features at different feature granularities, wherein the plurality of multi-modal video content features at the different feature granularities include a first multi-modal video content feature at a coarse granularity and a second multi-modal video content feature at a fine granularity;

calculating, based on the text content feature of each feature granularity, a similarity corresponding to the query text and a candidate video at the corresponding feature granularity, wherein the candidate video a first multi-modal video content feature at the coarse granularity and a second multi-modal video content feature at the fine granularity, further including:

performing cross-modal alignment on the coarse granularity between the first text content feature and the first multi-modal video content feature to obtain a similarity between the query text and the candidate video corresponding to the coarse granularity; and performing cross-modal alignment on the fine granularity between the second text content feature and the second multi-modal video content feature to obtain a similarity between the query text and the candidate video content retrieval result corresponding to the fine granularity; and determining, based on the similarities between the query text and the plurality of candidate videos at different feature granularities including the coarse granularity and the fine granularity, one of the plurality of candidate videos having a maximum similarity as a video content retrieval result corresponding to the query text.

2. The content retrieval method according to claim 1, wherein the calculating, based on the text content feature of each feature granularity, a similarity corresponding to the query and a candidate video at the corresponding feature granularity comprises:

determining a quantified retrieval result feature corresponding to each feature granularity of the candidate video; and calculating a similarity between the text content feature and the quantified retrieval result feature according to the feature granularity, to obtain the similarity at the corresponding feature granularity.

3. The method according claim 1, wherein the video content retrieval model is trained by:

obtaining sample query text and sample video content retrieval result that matches the sample query text, wherein the sample video content retrieval result includes a plurality of sample videos;

performing, through the text encoder and the video encoder in the video content retrieval model, feature extraction processing on the sample query text and the sample video content retrieval result, respectively, to obtain feature information of a plurality of feature granularities, the feature information comprising a query text content feature corresponding to the sample query text and a plurality of multi-modal sample video content features corresponding to the sample video content retrieval result;

performing, through the video content retrieval model, feature quantification processing on the query text content feature and the plurality of multi-modal sample video content features corresponding to the sample video content retrieval result, to obtain quantified feature information of each feature granularity;

calculating, based on the feature information and the quantified feature information, a retrieval semantic loss corresponding to each feature granularity; and performing model training on the video content retrieval model based on the retrieval semantic loss corresponding to each feature granularity.

4. The method according to claim 3, wherein the calculating, based on the feature information and the quantified feature information, a retrieval semantic loss corresponding to each feature granularity comprises:

calculating, based on the feature information and the quantified feature information, a first retrieval semantic loss of each feature granularity in a first semantic retrieval direction, and a second retrieval semantic loss of each feature granularity in a second semantic retrieval direction;

performing loss aggregation processing on the first retrieval semantic loss and the second retrieval semantic loss; and determining, according to a processing result of the loss aggregation processing, the retrieval semantic loss corresponding to each feature granularity.

5. The method according to claim 3, wherein the content retrieval model comprises a feature quantification module corresponding to each feature granularity, and each feature quantification module is configured to perform feature quantification processing on feature information of the feature granularity corresponding to each feature quantification module.

6. The method according to claim 3, wherein content retrieval model comprises a first coarse-grained feature extraction module for the sample video content retrieval result; and the performing, through a video content retrieval model, feature extraction processing on the sample video content retrieval result comprises:

obtaining a modal content feature corresponding to at least one content mode of the sample video content retrieval result;

separately performing, through the first coarse-grained feature extraction module, feature encoding processing on the modal content feature based on a self-attention mechanism, to obtain an encoded feature corresponding to each content mode; and performing feature aggregation processing on the encoded feature corresponding to each content mode, to obtain a coarse-grained video content retrieval result content feature of the sample video content retrieval result.

7. The method according to claim 3, wherein the content retrieval model comprises a fine-grained feature extraction module shared by the sample query text and the sample video content retrieval result; and the performing, through a video content retrieval model, feature extraction processing on the sample query text and the sample video content retrieval result, to obtain feature information of a plurality of feature granularities comprises:

obtaining a plurality of content features of the sample query text and the sample video content retrieval result;

performing feature clustering processing on the content features through the fine-grained feature extraction module; and determining feature information of a plurality of fine granularities based on a clustering result of the feature clustering processing, wherein the feature information comprises the query text content feature and the video content retrieval result content feature.

8. The method according to claim 3, wherein the performing model training on the video content retrieval model based on the retrieval semantic loss corresponding to each feature granularity comprises:

performing, according to a granularity type of the feature granularity, loss aggregation processing on the retrieval semantic loss corresponding to each feature granularity; and performing model training on the content retrieval model based on an aggregated retrieval semantic loss.

9. A computer device, comprising a memory and a processor, the memory storing a plurality of instructions, and the processor being configured to execute the plurality of instructions in the memory and cause the computer device to perform a video content retrieval method including:

obtaining a query text from a user, wherein the query text is associated with a plurality of candidate videos;

performing feature extraction processing on the query text through a text encoder in a video content retrieval model, to obtain a plurality of text content features at different feature granularities, wherein the plurality of text content features at the different feature granularities include a first text content feature at a coarse granularity and a second text content feature at a fine granularity;

transcribing the plurality of candidate video based on optical character recognition (OCR) and automatic speech recognition (ASR) technology to obtain a plurality of speech features and text features from the plurality of candidate videos;

performing multi-modal feature extraction processing on the plurality of candidate videos and their corresponding plurality of speech features and text features through a video encoder in the video content retrieval model, to obtain a plurality of multi-modal video content features at different feature granularities, wherein the plurality of multi-modal video content features at the different feature granularities include a first multi-modal video content feature at a coarse granularity and a second multi-modal video content feature at a fine granularity;

calculating, based on the text content feature of each feature granularity, a similarity corresponding to the query text and a candidate video at the corresponding feature granularity, wherein the candidate video a first multi-modal video content feature at the coarse granularity and a second multi-modal video content feature at the fine granularity, further including:

performing cross-modal alignment on the coarse granularity between the first text content feature and the first multi-modal video content feature to obtain a similarity between the query text and the candidate video corresponding to the coarse granularity; and performing cross-modal alignment on the fine granularity between the second text content feature and the second multi-modal video content feature to obtain a similarity between the query text and the candidate video content retrieval result corresponding to the fine granularity; and determining, based on the similarities between the query text and the plurality of candidate videos at different feature granularities including the coarse granularity and the fine granularity, one of the plurality of candidate videos having a maximum similarity as a video content retrieval result corresponding to the query text.

10. The computer device according to claim 9, wherein the calculating, based on the text content feature of each feature granularity, a similarity corresponding to the query and a candidate video at the corresponding feature granularity comprises:

determining a quantified retrieval result feature corresponding to each feature granularity of the candidate video; and calculating a similarity between the text content feature and the quantified retrieval result feature according to the feature granularity, to obtain the similarity at the corresponding feature granularity.

11. The computer device according to claim 9, wherein the video content retrieval model is trained by:

obtaining sample query text and sample video content retrieval result that matches the sample query text, wherein the sample video content retrieval result includes a plurality of sample videos;

performing, through the text encoder and the video encoder in the video content retrieval model, feature extraction processing on the sample query text and the sample video content retrieval result, respectively, to obtain feature information of a plurality of feature granularities, the feature information comprising a query text content feature corresponding to the sample query text and a plurality of multi-modal sample video content features corresponding to the sample video content retrieval result;

performing, through the video content retrieval model, feature quantification processing on the query text content feature and the plurality of multi-modal sample video content features corresponding to the sample video content retrieval result, to obtain quantified feature information of each feature granularity;

calculating, based on the feature information and the quantified feature information, a retrieval semantic loss corresponding to each feature granularity; and performing model training on the video content retrieval model based on the retrieval semantic loss corresponding to each feature granularity.

12. The computer device according to claim 11, wherein the calculating, based on the feature information and the quantified feature information, a retrieval semantic loss corresponding to each feature granularity comprises:

calculating, based on the feature information and the quantified feature information, a first retrieval semantic loss of each feature granularity in a first semantic retrieval direction, and a second retrieval semantic loss of each feature granularity in a second semantic retrieval direction;

performing loss aggregation processing on the first retrieval semantic loss and the second retrieval semantic loss; and determining, according to a processing result of the loss aggregation processing, the retrieval semantic loss corresponding to each feature granularity.

13. The computer device according to claim 11, wherein the content retrieval model comprises a feature quantification module corresponding to each feature granularity, and each feature quantification module is configured to perform feature quantification processing on feature information of the feature granularity corresponding to each feature quantification module.

14. The computer device according to claim 11, wherein content retrieval model comprises a first coarse-grained feature extraction module for the sample video content retrieval result; and the performing, through a video content retrieval model, feature extraction processing on the sample video content retrieval result comprises:

obtaining a modal content feature corresponding to at least one content mode of the sample video content retrieval result;

separately performing, through the first coarse-grained feature extraction module, feature encoding processing on the modal content feature based on a self-attention mechanism, to obtain an encoded feature corresponding to each content mode; and performing feature aggregation processing on the encoded feature corresponding to each content mode, to obtain a coarse-grained video content retrieval result content feature of the sample video content retrieval result.

15. The computer device according to claim 11, wherein the content retrieval model comprises a fine-grained feature extraction module shared by the sample query text and the sample video content retrieval result; and the performing, through a video content retrieval model, feature extraction processing on the sample query text and the sample video content retrieval result, to obtain feature information of a plurality of feature granularities comprises:

obtaining a plurality of content features of the sample query text and the sample video content retrieval result;

performing feature clustering processing on the content features through the fine-grained feature extraction module; and determining feature information of a plurality of fine granularities based on a clustering result of the feature clustering processing, wherein the feature information comprises the query text content feature and the video content retrieval result content feature.

16. The computer device according to claim 11, wherein the performing model training on the video content retrieval model based on the retrieval semantic loss corresponding to each feature granularity comprises:

performing, according to a granularity type of the feature granularity, loss aggregation processing on the retrieval semantic loss corresponding to each feature granularity; and performing model training on the content retrieval model based on an aggregated retrieval semantic loss.

17. A non-transitory computer-readable storage medium, storing a plurality of instructions, and the instructions being configured to be loaded by a processor of a computer device, and causing the computer device to perform a video content retrieval method including:

obtaining a query text from a user, wherein the query text is associated with a plurality of candidate videos;

performing feature extraction processing on the query text through a text encoder in a video content retrieval model, to obtain a plurality of text content features at different feature granularities, wherein the plurality of text content features at the different feature granularities include a first text content feature at a coarse granularity and a second text content feature at a fine granularity;

transcribing the plurality of candidate video based on optical character recognition (OCR) and automatic speech recognition (ASR) technology to obtain a plurality of speech features and text features from the plurality of candidate videos;

performing multi-modal feature extraction processing on the plurality of candidate videos and their corresponding plurality of speech features and text features through a video encoder in the video content retrieval model, to obtain a plurality of multi-modal video content features at different feature granularities, wherein the plurality of multi-modal video content features at the different feature granularities include a first multi-modal video content feature at a coarse granularity and a second multi-modal video content feature at a fine granularity;

calculating, based on the text content feature of each feature granularity, a similarity corresponding to the query text and a candidate video at the corresponding feature granularity, wherein the candidate video a first multi-modal video content feature at the coarse granularity and a second multi-modal video content feature at the fine granularity, further including:

performing cross-modal alignment on the coarse granularity between the first text content feature and the first multi-modal video content feature to obtain a similarity between the query text and the candidate video corresponding to the coarse granularity; and performing cross-modal alignment on the fine granularity between the second text content feature and the second multi-modal video content feature to obtain a similarity between the query text and the candidate video content retrieval result corresponding to the fine granularity; and determining, based on the similarities between the query text and the plurality of candidate videos at different feature granularities including the coarse granularity and the fine granularity, one of the plurality of candidate videos having a maximum similarity as a video content retrieval result corresponding to the query text.

18. The non-transitory computer-readable storage medium according to claim 17, wherein the calculating, based on the text content feature of each feature granularity, a similarity corresponding to the query and a candidate video at the corresponding feature granularity comprises:

determining a quantified retrieval result feature corresponding to each feature granularity of the candidate video; and calculating a similarity between the text content feature and the quantified retrieval result feature according to the feature granularity, to obtain the similarity at the corresponding feature granularity.

19. The non-transitory computer-readable storage medium according to claim 17, wherein the video content retrieval model is trained by:

obtaining sample query text and sample video content retrieval result that matches the sample query text, wherein the sample video content retrieval result includes a plurality of sample videos;

performing, through the text encoder and the video encoder in the video content retrieval model, feature extraction processing on the sample query text and the sample video content retrieval result, respectively, to obtain feature information of a plurality of feature granularities, the feature information comprising a query text content feature corresponding to the sample query text and a plurality of multi-modal sample video content features corresponding to the sample video content retrieval result;

performing, through the video content retrieval model, feature quantification processing on the query text content feature and the plurality of multi-modal sample video content features corresponding to the sample video content retrieval result, to obtain quantified feature information of each feature granularity;

calculating, based on the feature information and the quantified feature information, a retrieval semantic loss corresponding to each feature granularity; and performing model training on the video content retrieval model based on the retrieval semantic loss corresponding to each feature granularity.

20. The non-transitory computer-readable storage medium according to claim 19, wherein the performing model training on the video content retrieval model based on the retrieval semantic loss corresponding to each feature granularity comprises:

performing, according to a granularity type of the feature granularity, loss aggregation processing on the retrieval semantic loss corresponding to each feature granularity; and performing model training on the content retrieval model based on an aggregated retrieval semantic loss.

\* \* \* \* \*